(12) United States Patent
Doshi et al.

(10) Patent No.: US 10,944,743 B2
(45) Date of Patent: Mar. 9, 2021

(54) RICH COMMUNICATION SERVICES SECURITY AUTHENTICATION SYSTEM

(71) Applicant: ADP, LLC, Roseland, NJ (US)

(72) Inventors: Sonal Doshi, Roseland, NJ (US); Frank Villavicencio, New York City, NY (US); Suresh Bezawada, Hyderabad (IN)

(73) Assignee: ADP, LLC, Roseland, NJ (US)

( * ) Notice: Subject to any disclaimer, the term of this patent is extended or adjusted under 35 U.S.C. 154(b) by 241 days.

(21) Appl. No.: 16/254,376

(22) Filed: Jan. 22, 2019

(65) Prior Publication Data

US 2020/0236105 A1 Jul. 23, 2020

(51) Int. Cl.
*H04L 29/06* (2006.01)
*G06F 21/31* (2013.01)
*G06F 21/40* (2013.01)

(52) U.S. Cl.
CPC ...... *H04L 63/0853* (2013.01); *H04L 63/0876* (2013.01); *H04L 63/0884* (2013.01); *H04L 63/18* (2013.01); *H04L 63/0281* (2013.01); *H04L 63/083* (2013.01)

(58) Field of Classification Search
CPC ............. H04L 63/0853; H04L 63/0876; H04L 63/0884; H04L 63/18
USPC .......................................................... 726/7
See application file for complete search history.

(56) References Cited

U.S. PATENT DOCUMENTS

| | | | |
|---|---|---|---|
| 8,286,227 B1 | 10/2012 | Zheng | |
| 8,365,258 B2 | 1/2013 | Dispensa | |
| 8,627,438 B1 | 1/2014 | Bhimanaik | |
| 8,762,529 B1 * | 6/2014 | Payne | H04L 63/107 709/225 |
| 8,874,766 B2 * | 10/2014 | Nedbal | H04L 63/10 709/228 |
| 2009/0059848 A1 * | 3/2009 | Khetawat | H04L 45/24 370/328 |
| 2009/0270099 A1 * | 10/2009 | Gallagher | H04W 8/08 455/435.1 |
| 2012/0289219 A1 * | 11/2012 | Parmar | H04M 3/523 455/419 |
| 2013/0007854 A1 * | 1/2013 | Sorenson, III | H04L 63/061 726/5 |
| 2013/0340089 A1 * | 12/2013 | Steinberg | H04L 51/12 726/27 |

(Continued)

*Primary Examiner* — Haresh N Patel
(74) *Attorney, Agent, or Firm* — Yee & Associates, P.C.

(57) ABSTRACT

A method, a computer system, and a computer program product for authenticating a transaction are provided. An authentication system receives the transaction over a particular channel of a plurality of support channels. A risk score is determined for the transaction based on a number of contextual risk factors. An authentication scheme is determined from a number of authentication schemes for authenticating an identity of the user within an authentication context. The authentication scheme is determined based on the particular channel and the risk score. In response to successfully authenticating the identity of the user within the authentication context, the authentication system determines whether the transaction is a permitted transaction based on an assurance level associated with the authentication context. In response to determining that the transaction is the permitted transaction, the transaction is authenticated.

33 Claims, 20 Drawing Sheets

(56) References Cited

U.S. PATENT DOCUMENTS

| | | | |
|---|---|---|---|
| 2015/0019862 A1* | 1/2015 | Uczekaj | G06F 21/71 |
| | | | 713/155 |
| 2015/0249540 A1 | 9/2015 | Khalil et al. | |
| 2015/0379246 A1* | 12/2015 | Alme | H04L 63/14 |
| | | | 726/23 |
| 2015/0381621 A1* | 12/2015 | Innes | H04L 63/0884 |
| | | | 726/7 |
| 2016/0099944 A1* | 4/2016 | Peterka | H04L 63/0428 |
| | | | 726/4 |
| 2016/0253512 A1* | 9/2016 | Evers | H04W 12/06 |
| | | | 726/6 |
| 2017/0222968 A1* | 8/2017 | Li | H04L 67/306 |
| 2017/0230335 A1* | 8/2017 | Walker | H04L 63/0272 |
| 2018/0359284 A1* | 12/2018 | Kotreka | H04L 65/1069 |
| 2019/0149514 A1* | 5/2019 | Jawahar | H04L 9/3268 |
| | | | 726/7 |
| 2019/0149532 A1* | 5/2019 | Newberg | H04W 12/06 |
| | | | 726/5 |
| 2019/0158658 A1* | 5/2019 | Gebers | H04M 15/04 |

\* cited by examiner

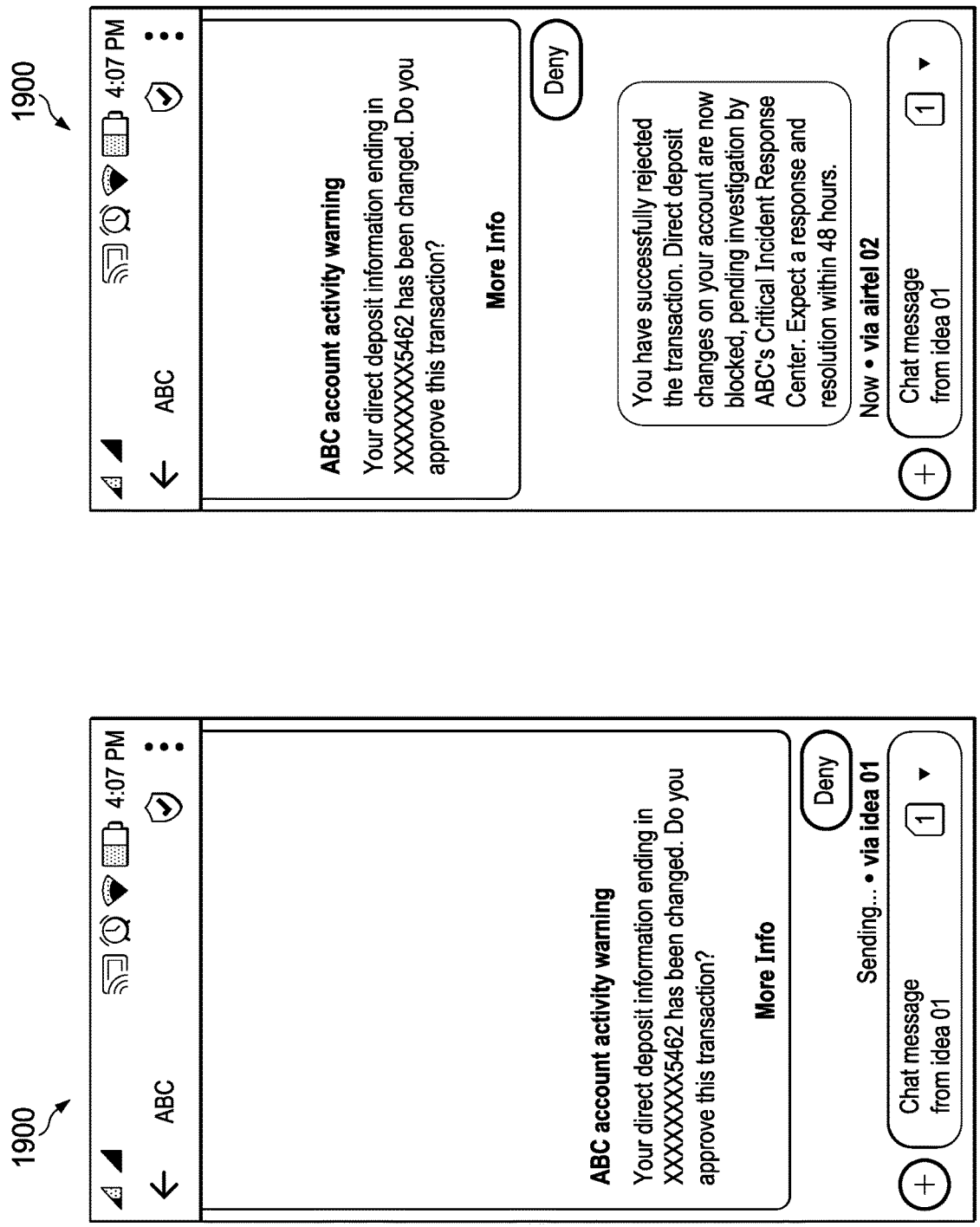

RICH COMMUNICATION SERVICES SECURITY AUTHENTICATION SYSTEM

BACKGROUND INFORMATION

1. Field

The present disclosure relates generally to an improved authentication system for a device and, in particular, to a method and system for authenticating a transaction from a user at a first device using credentials from a second device.

2. Background

Mobile devices, such as tablet PCs and smartphones, are increasing in popularity and are quickly replacing desktop Personal Computers (PCs) in both consumer and business sectors. Mobile devices connected to the Internet allow users to access even the most sensitive information, such as payroll or other financial information and accounts, from anywhere that a connection to the Internet is available.

A single user often has an account with different service providers, such as employers, financial institutions, or other entities, each with a unique username and password associated with the account. These existing authentication security systems are often conceived and implemented in a silo manner, with specialization in a particular area or channel. For example, a single organization may have multiple authentication schemes, such as a web-based authentication scheme, an application programming interface security authentication scheme, a mobile authentication scheme, a biometric authentication scheme, and in many cases, these schemes are augmented by a risk-based authentication scheme.

It would be desirable to have a method and apparatus that take into account at least some of the issues discussed above, as well as other possible issues. For example, it would be desirable to have a method and apparatus that overcome a technical problem with authenticating a specific transaction from a user to provide consistent authentication across multiple interaction channels.

SUMMARY

Embodiments of the present disclosure provide a method, computer system, and computer program product for authenticating a transaction of a user. In one illustrative example, a gateway receives a transaction request from a secondary device communicating over a first network. The transaction request references a user's account. The transaction identifies the secondary device within the first network. The gateway identifies a primary device associated with the user's account. The primary device communicates over a second network. The Gateway identifies an interaction template associated with the specific transaction request. The interaction template describes a conversational flow of messages for requesting verification of the transaction. The Gateway initiates a dialog with the primary device over the second network. The dialog includes sending a transmission built from a message in the interaction template that requests verification of the transaction. The Gateway processes a response received over the second network from the primary device. The information in the response is processed based on rules that describe a conversational flow through the interaction template. The Gateway posts the information in the response over the first network to the secondary device. The transaction is thus authenticated at the secondary device according to the posted information.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will be best understood by reference to the following detailed description of an illustrative embodiment of the present disclosure when read in conjunction with the accompanying drawings, wherein:

FIG. 21 is a third illustration of a graphical user interface on an RCS-enabled primary device for authenticating a second user transaction in accordance with an illustrative embodiment;

FIG. 22 is a fourth illustration of a graphical user interface on an RCS-enabled primary device for authenticating a second user transaction in accordance with an illustrative embodiment;

DETAILED DESCRIPTION

The illustrative embodiments recognize and take into account one or more different considerations. For example, the illustrative embodiments recognize and take into account that current methodologies for identifying a user are not as efficient as desired. The illustrative embodiments also recognize and take into account that a user can have multiple user identities and user accounts for various service providers. The illustrative embodiments recognize and take into account that there may be different ways or different authentication schemes for verifying the user's credentials. For example, the user may log into a server directly, using a username and a password. Alternatively, the user may login to the server using a federated authentication scheme, in which the credentials and their verification is done by a trusted third-party provider. The illustrative embodiments recognize and take into account that existing solutions may inconsistently verify the identity of the user based on different risk policies that are applied to different access channels.

The illustrative embodiments provide a method, a computer system, and a computer program product for authenticating a transaction of a user. In one illustrative example, an authentication system receives a transaction over a particular channel. The particular channel is one of a plurality of support channels. The authentication system determines a risk score for the transaction based on a number of contextual risk factors. The authentication system determines an authentication scheme from a number of authentication schemes for authenticating an identity of the user within an authentication context. The authentication scheme is determined based on the particular channel and the risk score. The authentication system uses the authentication scheme to authenticate the identity of the user within the authentication context. In response to successfully authenticating the identity of the user within the authentication context, the authentication system determines whether the transaction is a permitted transaction based on an assurance level associated with the authentication context. In response to determining that the transaction is a permitted transaction, the authentication system authenticates the transaction.

Figure 1:
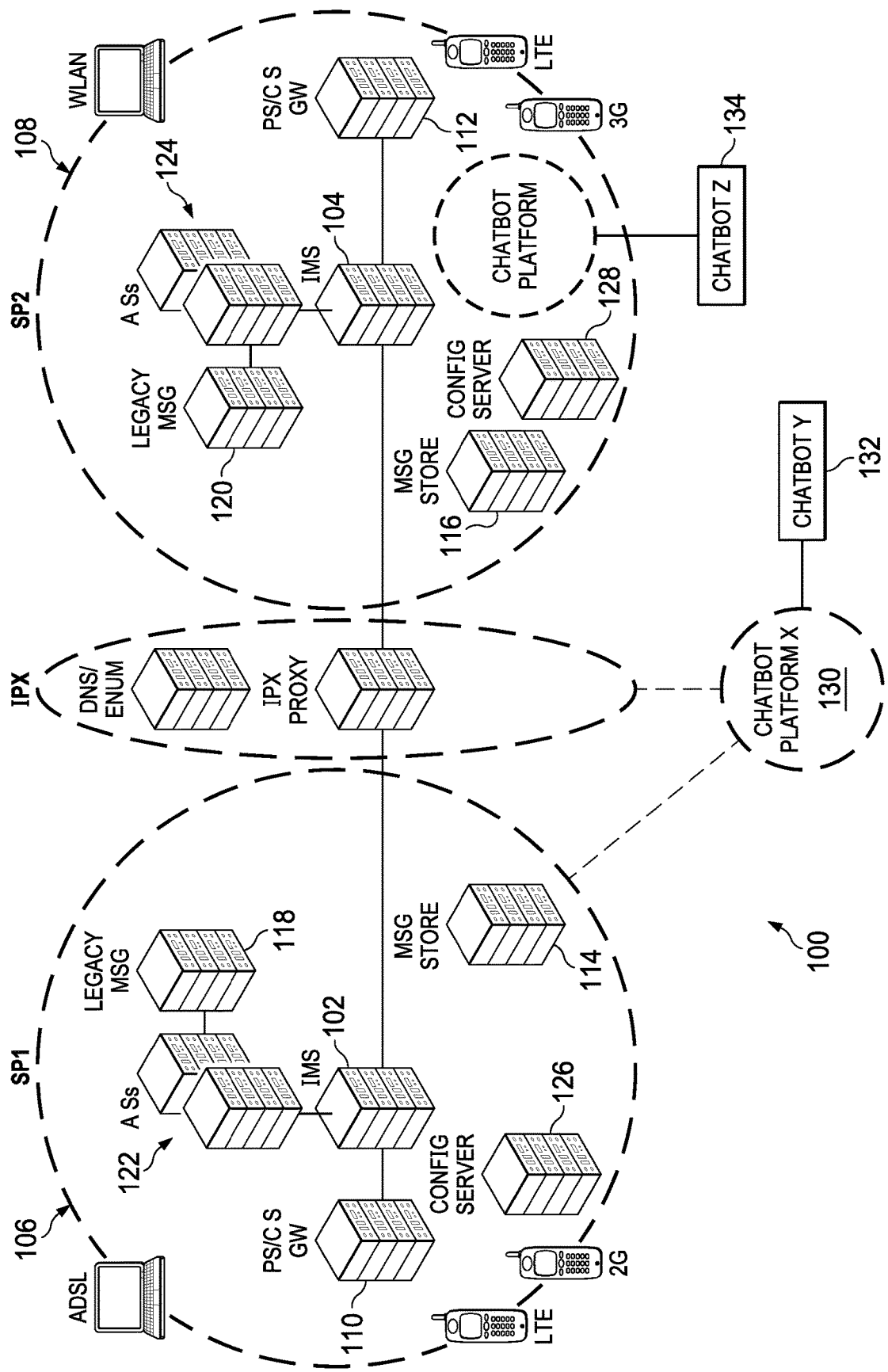
FIG. 1 is an illustration of a block diagram of a simplified example of the Rich Communication Services architecture in accordance with an illustrative embodiment.

With reference now to the figures and, in particular, with reference to FIG. 1, an illustration of a block diagram of a simplified example of the Rich Communication Services architecture is depicted in accordance with an illustrative embodiment.

Rich Communication Services (RCS) architecture 100 is a communication protocol between mobile-telephone carriers and between phone and carrier, aiming at replacing SMS messages with a text message system that is richer, provides phonebook polling (for service discovery), and transmits in-call multimedia. RCS combines different services defined by 3GPP and Open Mobile Alliance (OMA) with an enhanced phonebook. Another phone's capabilities and presence information can be discovered and displayed by a mobile phone. RCS reuses 3GPP specified IMS core system as the underlying service platform taking care of issues such as authentication, authorization, registration, charging, and routing.

For RCS, the base network element is IMS core system 102, 104 which enables peer-to-peer communication between RCS clients. Other network nodes can be deployed by RCS Service Providers 106, 108.

FIG. 1 shows examples of two RCS Service Providers 106, 108 exchanging traffic with each other using the standard NNI mechanisms, such as IPX and IP Packet Exchange. Each of Service Provider 106, 108 may choose a different approach to implement a function within the Service Provider domain not influencing the interoperable Network-to-Network Interface (NNI) aspects. RCS Service Provider 106, 108 may provision different services for different users and/or devices based on internal policies, such as having an active subscription to one service.

PS/CS gateway (GW) 110, 112 is used for interworking between Circuit Switched (CS) and Packet Switched (PS) voice, for example, Voice over Long Term Evolution (VoLTE). MSG Store 114, 116 relates to the CPM (Converged IP Messaging) Message Store Server. Legacy Msg 118, 120 refers to the Short Message Service (SMS)/Multimedia Message Service (MMS) services that may be utilized via an IWF (Interworking Function) located in the group of Application Servers (ASs) 122, 124. In addition to these IWF node(s), Application Servers (ASs) 122, 124 may also include various other nodes used by the RCS services, for example, a Presence Server, a Messaging Server, a Multimedia Telephony (MMTEL) Application Server, and support of Chatbot Functionality. Autoconfiguration Server 126, 128 is used to provide clients with a configuration to support RCS services.

RCS architecture 100 also provides support for Chatbot communications through the integration of Chatbot Platforms 130, 132, 134. These platforms can either connect through the interconnect infrastructure or connect directly to an RCS Service Provider's network. A Chatbot is an RCS-based automated service provided to users whose output is presented in a conversational form. Services are often provided as a piece of software interfacing with one or more users aiming to simulate intelligent human conversation.

RCS compliant access networks include, but are not limited to, those illustrated in FIG. 1. Thus, deploying the RCS service does not indicate a 3G network should always be deployed.

Figure 2:
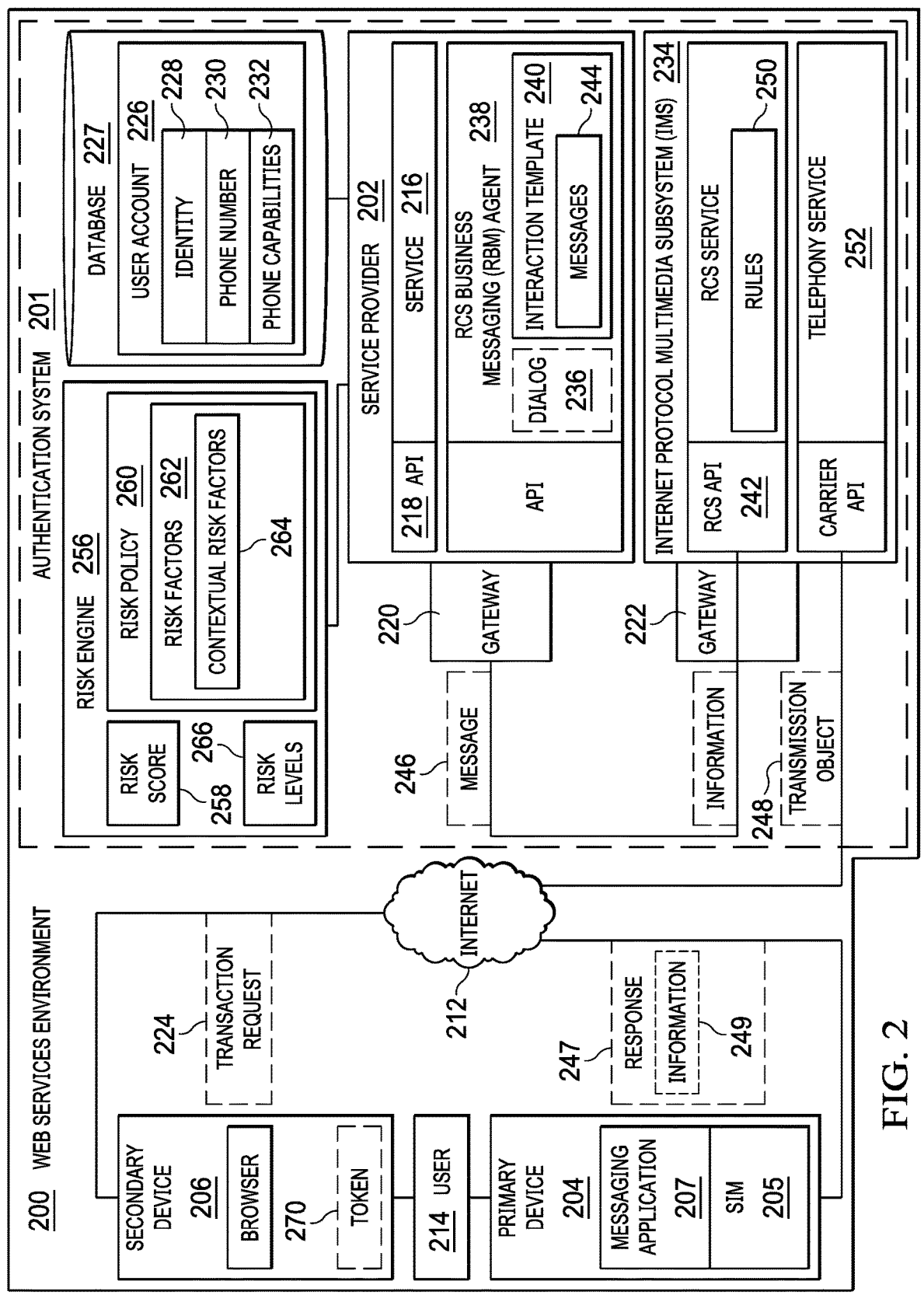
FIG. 2 is an illustration of a block diagram of a web services environment in accordance with an illustrative embodiment.

With reference to FIG. 2, an illustration of a web services environment is depicted in a form of a block diagram in accordance with an illustrative embodiment. In this illustrative example, web services environment 200 is an example of a system that leverages RCS messaging to enable password-free user authentication login of transactions between various software systems over one or more computer networks.

The one or more computer networks may include at least one of the Internet, a private network, a public network, or some other type of network. As used herein, the phrase "at least one of," when used with a list of items, means different combinations of one or more of the listed items may be used, and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

In this illustrative example, web services environment 200 enables communications between a plurality of client devices and plurality of resources. Each client device of plurality of client devices may also be referred to as a service requestor. Each resource of plurality of resources may also be referred to as a service provider that provides one or more services.

Web services environment 200 includes authentication system 201. Authentication system 201 may be implemented in software, hardware, firmware, or a combination thereof. When software is used, the operations performed by authentication system 201 may be implemented in program code configured to run on hardware, such as a processor unit. When firmware is used, the operations performed by authentication system 201 may be implemented in program code and data and stored in persistent memory to run on a processor unit. When hardware is employed, the hardware may include circuits that operate to perform the operations in authentication system 201.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Authentication system 201 may be implemented in one or more computer systems. The computer systems are hardware systems that include one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with reliably authenticating a user attempting to access information from an untrusted system. As a result, one or more technical solutions may provide a technical effect of reliably authenticating identity 228 of user 214 in an authentication context that provides an adequate one of identity assurance levels by leveraging RCS messaging to enable password-free user authentication login of transactions between various software systems over one or more computer networks.

As depicted, service provider 202 provides rich communication services to one or more clients. Service provider 202 may provision different services for different users and/or devices based on internal policies, such as, for example, but not limited to, a client having an active subscription to one or more services.

Each client of plurality of clients and each resource of plurality of resources may take the form of software. Further, each client device in plurality of client devices and each resource of plurality of resources may be run on one or more computer devices. For example, a client device of plurality of client devices may be implemented on hardware that includes at least one of a computer system, a processor unit, a microprocessor, a tablet, a laptop, a smart television, a smartphone, or some other type of data processing system or electronic device. Similarly, a resource of plurality of resources may be implemented on hardware that includes at least one of a computer system, a processor unit, a microprocessor, a tablet, a laptop, a smart television, a smartphone, a server, or some other type of data processing system or electronic device.

In this illustrative example, the plurality of client devices can include primary device 204 and secondary device 206. Primary device 204 is a device carrying Subscriber Identity Module (SIM) 205 that is associated with the identity used for rich communication services. The identity used for the rich communication services can be, for example, an Internet Protocol Multimedia Subsystem Public identity (IMPU) or a Mobile Subscriber Integrated Services Digital Network Number (MSISDN).

Secondary device 206 is a device that does not carry SIM 205 that is associated to the identity used for the rich communication services. It may happen that a secondary device carries a SIM (e.g. a tablet or PC providing cellular data connectivity). However, a SIM in secondary device 206 will be associated to a different identity than the one used by primary device 204 for RCS.

Primary device 204 and secondary device 206 may use one or more different channels to connect to authentication system 201 via network 212. In one illustrative example, primary device 204 and secondary device 206 may access authentication system 201 via a wireless cellular data network channel, such as a code division multiple access (CDMA) or a global system for mobiles (GSM), to access the Internet. Alternatively, secondary device 206 may access authentication system 201 via a wired link to network 212. Authentication system 201 may access the Internet via a wired link. In this manner, both primary device 204 and secondary device 206 are in communication with authentication system 201 via network 212.

In one illustrative example, plurality of resources 208 may be affiliated with a particular entity providing RCS Business Messaging services. The entity may take the form of, for example, without limitation, a business entity, an organization, a corporation, or some other type of entity.

RCS Business Messaging services upgrades traditional SMS mobile messaging with branding, rich media, interactivity and analytics. RCS Business Messaging provides the opportunity for businesses to increase customers' engagement within the messaging app itself. By making use of business messaging using chatbots and artificial intelligence (AI), users engage with virtual assistants, thereby gaining direct access to a range of brands and services.

As depicted, a plurality of resources may be connected to and accessed over an internal network within authentication system 201. In this illustrative example, the internal network may be in communication with Internet 212. Internet 212 may refer to the common use of the term "Internet." in some cases, Internet 212 may refer to a group of networked computers or a group of interconnected computer networks. One or more of primary device 204 and secondary device 206 may attempt to access plurality of resources 208 through Internet 212.

As depicted, primary device 204 and secondary device 206 may be affiliated with the same entity or different entities. In other illustrative examples, one or more of primary device 204 and secondary device 206 may be affiliated with user 214. In one illustrative example, user 214 may attempt to access plurality of resources 208 using one or more of a consumer application, an email client, a web browser, a login application, or some other type of software component that executes on one or more of primary device 204 and secondary device 206.

Web services environment 200 includes plurality of resources and plurality of interfaces associated with plurality of services. For example, service 216 may take the form of, for example, without limitation, a human resources service, a payroll service, an employee benefits service, a search engine, a research service provider, a governmental service provider, or some other type of service provider.

Each interface in plurality of interfaces is associated with a corresponding resource. In this illustrative example, each interface in plurality of interfaces may also be referred to as an application programming interface (API). For example, application programming interface 218 is associated with, and provides access to, service 216.

Gateway 220 and 222 may be used to facilitate communications between user 214 and a plurality of services. Gateway 220 and 222 may each be implemented using software, hardware, firmware, or a combination thereof. Depending on the implementation, gateway 220 and 222 may be implemented on the same computer device or on different computer devices that are in communication with each other. In this illustrative example, gateway 220 and 222 may communicate over an internal network in authentication system 201. However, in other illustrative examples, gateway 220 may communicate with gateway 222 over Internet 212.

In this illustrative example, web services environment 200 includes service provider 202. Service provider 202 authenticates transaction request 224 from secondary device 206 by verifying identity 228 of user 214 based on the RCS Universal Profile of primary device 204.

As used herein, the Universal Profile describes a single, global RCS implementation that will be deployed worldwide. The aim of this profile is to reduce the variation that exists today across various RCS profiles in order to simplify large-scale deployment.

The Universal Profile can be implemented by a developer or OEM, tightly integrating the capabilities and services within the address book and many other native touch points across the device. Alternatively, the Universal Profile can be implemented as a downloadable application that can be downloaded from application stores and accessible as a separate application on primary device 204, usually within the device's application folder or desktop.

In one illustrative example, when transaction request 224 is authenticated, service provider 202 permits access to service 216. For example, service provider 202 may permit access such as at least one of reading, writing, modifying, or operating on information associated with service 216.

In this manner, authentication environment 202 provides methods and systems for authenticating a transaction that is received from secondary device 206 that is not associated with a registered Universal Profile.

In this illustrative example, gateway 220 receives transaction request 224 from secondary device 206 communicating over a first network. Transaction request 206 references user account 226. The transaction identifies secondary device 206 within the first network.

In one illustrative example, transaction request 206 may be a login request. A login is an entry point for access to service 216 provided by service provider 202, and many a times users have struggled with passwords and remembering them.

Transaction request 206 may reference user account 226 based on information supplied by user 214. For example, user 214 may enter a username or a keyword on the login page and press the "sign in" button.

Transaction request 224 may identify secondary device 206 according to a number of different forms. For example, transaction request 224 may include a unique identifier such as a cookie, a pixel tag, a text file, a device identifier, an Internet Protocol address, a device fingerprint, a browser fingerprint, or some other suitable mechanism that is currently used to identify users visiting websites. A device identifier may be, for example, a unique identifier for a processor unit, a media access control (MAC) address, or some other identifier based on hardware. The device identifier may be assigned to and stored on secondary device 206. In one illustrative example, transaction request 224 can include at least one of a username or a keyword to uniquely identify user account 226.

Receipt of transaction request 224 generates a lookup in database 227 based on identity 228 of user 214. The lookup identifies phone number 230 associated with primary device 204. The lookup may additionally identify the cached capabilities of primary device 204 that is associated with user 214.

RCS defines a telephony feature tag used to indicate to the IMS network whether the device supports RCS telephony services and hence can receive SMSs associated with the identity used for RCS when the device is not registered in IMS subsystem 234 for messaging. If the phone is not RCS capable, service provider 202 would fall back to the regular password request for authenticating the requested transaction. Therefore, if RCS is not supported by primary device 204, message 246 is relayed to an MMS or SMS gateway (not shown). If primary device 204 is RCS capable, dialog 236 is initiated between RCS Business Messaging (RBM) agent 238 and RCS API 242.

RBM agent 238 is a representation of a business entity that can initiate and handle dialogs and transmissions. RBM agent 238 maintains business-specific information and assets for a business entity, such as an address, a phone number, a logo, and a banner image, as well as other suitable information such as project details and credentials. RBM agent 238 can entertain multiple dialogs with individual users according to the identified interaction template and the user's phone number, such as phone number 230.

Dialog 236 is a materialized interaction template 240 at the time the first RBM transmission is being sent to the user. In one illustrative example, a lifetime of dialog 236 is limited; if there are no messages exchanged for a while between the agent and the user, dialog 236 is considered terminated.

In one illustrative example, dialog 236 includes configuration information for sending and receiving user data and content. The configuration information in dialogue 236 includes at least one of Java Script Object Notation (JSON) service definition configuration information or other suitable types of configuration information. For example, service definitions may include information for using JSON objects through restful application programming interfaces to send and receive user data and content.

Unless a simple, communication-style message is send out, in which case a single transmission object is sufficient, RBM agent 238 typically initiates dialogue 236 with a user by providing a story tag for a particular one of interaction template 240 and phone number 230 associated with primary device 204. For example, RBM agent 238 may initiate dialogue 236 by a POST request formatted as follows:

```
POST /rcs/v1/<agent>/dialog/<story>/<phone>
For example, the POST request:
    POST https://rcs.cftxt.net/rcs/v1/1/
    dialog/adp2fa/18185551212{"ttl": 20 }
``` is used to initiate a dialogue between a primary device at telephone number "18185551212" based on the interaction template "adp2a."

For example, the interaction template "adp2a" can take the form of a JSON object such as:

```
{
  "tag": "adp2fa",
  "hint": "ADP 2FA demo",
  "events_url": "https://adp-
rcs.callfire.com/2FAevent",
  "first_message": "2farq",
  "default_response": { "message": "2faconfused" },
  "sequence": {
    "2farq/confirm": {
      "url": "https://adp-
rcs.callfire.com/2FAresponse/confirm",
      "error": "2fafailed"
    },
    "2falocation/location": {
      "url": "https://adp-
rcs.callfire.com/2FAresponse/location",
      "error": "2fafailed"
    },
    "2falocation/cancel": {
```

-continued
```
      "message": "2fathanks"
    },
    "2farq/report": {
      "url": "https://adp-
rcs.callfire.com/2FAresponse/report",
      "error": "2fafailed"
    },
    "2faconfirm/*": {
      "message": "2fathanks"
    },
    "2fareport/*": {
      "message": "2fathanks"
    },
    "_/60": "2fathanks"
  }
}
```

Interaction template 240, sometimes referred to as a "story object," describes a conversational flow between RBM agent 238 and primary device 204 of user 214 that has been contacted. Interaction template 240 is largely formalized as "if this response, send this message" style tuples; however, interaction template 240 also carries metadata attributes similar to the ones of the messages.

Upon initiation of dialogue 236, RCS API 242 finds the first one of messages 244 indicated by the identified interaction template 240. ACS API 242 queues the first one of messages 244 for sending to user 214 at primary device 204.

Each of messages 244 represents a stored template of the actual RCS payload to be sent from RBM agent 238 to user 214 of primary device 204. Messages 244 may also include metadata such as a unique identifier, a description, scheduling attributes, and other appropriate attributes. Message objects can be aggregated into one or more stories and sequenced depending on the user response.

For example, the first message object "2farq" of the interaction template "adp2a" can take the form of a JSON object such as:

```
{
  "tag": "2farq",
  "hint": "ADP 2FA demo first message",
  "rcs_type": "card",
  "rcs_content": {"card": "2farq", "orientation":
"VERTICAL"},
  "ttl": 120
}
```

For reusability purposes, some parts of the message, such as, for example, cards and media files, can be saved and managed separately. For example, the first message object "2farq" can include the separately managed card object "2farq" and can take the form of a JSON object such as:

```
{
  "tag": "2farq",
  "title": "ADP one-touch login",
  "description": "We received a login request from your
browser. Please confirm you issued it.",
  "media": "2farq",
  \"suggestions": [
    {
      "tag": "confirm",
      "text": "Confirm",
      "reply": "confirm"
    }, {
      "tag": "report",
      "text": "Report fraud",
```

-continued

```
    "reply": "report"
    }
  ]
}
```

For example, the first message object "2farq" can include the separately managed media object "2farq" and can take the form of a JSON object such as:

```
{
  "tag": "2farq",
  "mime_type": "image/png",
  "height": "TALL",
  "url": "https://rcs.cftxt.net/res/v1/1/media-
    file/adplogo.png"
}
```

To send message 246 to primary device 204 at phone number 230, transmission object 248 needs to be generated. Transmission object 248 is the materialized form of message 246 at the time it is being sent. Transmission object 248 is based on a pre-existing one of message 246 of messages 244. Transmission object 248 needs to have a phone number to be sent to, priority and timing information, and a substitution list of variable-value tuples if the message contains any variables. RBM agent 238 creates transmission object 248 based on message 246 of interaction template 240. RBM agent 238 then schedules transmission object 248 for sending, according to rules 250. Rules 250 can include rules for sending transmissions as well as specific dialog rules that, if present, may override the transmission rules.

In one illustrative example, RCS API 242 determines a gateway for sending transmission object 248, such as by performing a LCR algorithm. As stated above, the phone RCS capabilities 232 are checked; message 246 is relayed to an MMS or SMS gateway if primary device 204 does not support RCS.

If primary device 204 does support RCS, message 246 is rendered according to the RCS gateway rules 250 to obtain the content payload. Variable-value substitutions are performed according to the list of variable-value tuples, dynamically replacing parts of the message content. Transmission object 248 is then scheduled for sending at either a later time, or as soon as possible. When the sending time has come, a check is made to ensure the time restrictions are not in effect, and then the transmission is queued by default in the lowest priority queue. From there, the transmission payload is collected when its turn comes, and transmission object 248 gets sent to gateway 222 for telephony service 252.

RCS API 242 replies to RBM agent 238 above with a description of the dialog object sent to primary device 204. This would be an indication that the last message has been delivered to primary device 204; however, RBM agent 238 may receive info that message 246 has been scheduled, may have been bounced, may have been read by the user, as well as other suitable indications.

RCS API 242 updates and registers events and transmission states over the lifetime of transmission object 248. If requested, RCS API 242 communicates the events and transmission states back to RBM agent 238 via a provided REST API interface.

For example, upon delivery of message object "2farq," RCS API 242 can reply to RBM agent 238 by posting a reply object that can take the form of a JSON object such as:

```
{
  "id": "...dialog_id...",
  "agent": 1,
  "phone": "18185551212",
  "story": "adp2fa",
  "events_url": "https://adp-
    rcs.callfire.com/2FAevent",
  "last_tx_message": "2farq",
  "schedule_at": 1530839823,
  "priority": "NORMAL"
}
```

In one illustrative example, a message, such as message 246, is sent to call for response 247 from user 214. User 214 may press a button offered by message 246, in which case another message having information 249 is sent. Alternatively, user 214 may respond with an expected word, in which case yet another message having different information 249 can be sent. Still further, user 214 may type an unexpected response, in which case a third type of message having different information 249 is sent.

In one illustrative example, interaction template 240 can also offer "catch-anywhere" handling to account for different responses from user 214. For example, user 214 may type "customer service" at any time during dialog 236. Upon receiving information 249 in the corresponding one of response 247, RBM agent 238 may send a subsequent one of message 246 in which a phone call is offered.

In this manner, interaction template 240 provides dynamic control of dialog 236. For example, instead of hardcoding message 246 to be sent in response to response 247, the content information 249 of response 247 and the context will be sent to RBM agent 238 via a customer-provided REST API. RBM agent 238 is expected to indicate the next message to send according to interaction template 240.

Typically, a message is sent to call for user action. RCS API 242 monitors user activity and reports activities back to RBM client 238 by gateway 222. When user 214 takes some action regarding the RCS transmission 248 received, e.g., that the user tapped a "confirm" button in transmission 248, RCS API 242 contacts RBM agent 238 in response to receiving response 247 from primary device 204.

In one illustrative example, a message, such as message 246, is sent to call for response 247 from user 214. User 214 may press a button offered by message 246, in which case another message having information 249 is sent. Alternatively, user 214 may respond with an expected word, in which case yet another message having different information 249 can be sent. Still further, user 214 may type an unexpected response, in which case a third type of message having different information 249 is sent.

For example, RCS API 242 may indicate response 254 from user 214 by a POST request formatted as follows:

POST https://adp-rcs.callfire.com/2FAresponse/con-
    firm?dialog= . . . dialog_id . . .
    &user=18185551212
    &story=adp2fa&message=2farq&response=confirm Response 247 is processed based on the story rules 250. If a matching message tag and response pattern is found, the next transmission is built based on the message indicated, and queued for sending as soon as possible. If, instead of a static message tag, a URL is indicated as the message to be sent, gateway 222 sends a POST request to that gateway, with context information (the tag of the last message sent, user's response, timestamp, etc). Thus, when invoked, RBM agent 238 will typically do its own processing, and return the tag of message 246 to be sent next, plus any optional variable-value tuples to be replaced.

In this manner, interaction template 240 provides dynamic control of dialog 236. For example, instead of hardcoding message 246 to be sent in response to response 247, RCS API 242 sends the content and the context information 249 of response 247 to RBM agent 238 via a customer-provided REST API. RBM agent 238 is expected to indicate the next message to send according to interaction template 240.

RCS API 242 would then wait for RBM agent 238 to indicate a next one of messages 244 to send. RBM agent 238 may reply with a message confirmation, such as:

{"message": "2faconfirm"}

For example, upon indication of response 247 from user 214, RBM agent 238 can reply to RCS API 242 by posting a next one of messages 244 that can take the form of a JSON object such as:

```
{
  "tag": "2faconfirm",
  "hint": "ADP 2FA demo confirmation of login",\
  "rcs_type": "text",
  "rcs_content": "Thank you. Your browser will log you
    in in a few seconds.",
  "suggestions": [
    {
      "tag": "logout",
      "text": "Log out",
      "reply": "logout"
    }
  ]
}
```

In one illustrative example, authentication system 201 includes risk engine 256. In one illustrative example, risk engine 256 is an adaptive authentication and fraud detection platform for authenticating transaction request 224 within an authentication context. Risk engine 256 uses a risk-based, multifactor authentication. Using a risk and rules-based approach, risk engine 256 may prohibit or require additional identity assurances if transaction request 224 is determined to have a high risk score 258, violates risk policy 260, and combinations thereof.

In one illustrative example, risk engine 256 uses a self-learning statistical evaluation to generate risk score 258 for transaction request 224. Risk score 258 can be a numeric score within a predefined range, where higher scores indicate a greater level of risk. In an illustrative embodiment, risk engine 256 determines risk score 258 by applying risk policy 260 to context parameters of transaction request 224.

In this illustrative example, risk policy 260 is a group of rules. Risk policy 260 also may include data used to apply the group of rules. As used herein, the phrase "a group of," when used with reference to items, means one or more items. For example, "a group of rules" is one or more rules.

For example, risk policy 260 may include one or more rules related to risk factors 262. Risk factors 262 are circumstances that indicate a potential risk associated with transaction request 224. Risk factors 262 may include circumstances such as time of day, geographic location, quality of network connections, or other factors. For example, the geographic location of secondary device 206 may be ascertained using network connections or information in transaction request 224. Certain geographic locations have an elevated risk, such as, for example, an international location. As another example, the quality of network connections may influence risk score 258. In this example, the quality of network connections is based on signal strength (e.g., latency or wireless signal strength) or a presence or lack of an encrypted wireless connection.

As depicted, contextual risk factors 264 are risk factors 262 that are applicable to any context parameters of transaction request 224 and current authentication context. For example, contextual risk factors 264 can include a transaction type of transaction request 224, current authentication context, a time of day that transaction request 224 is received, a geographic location from which transaction request 224 is received, a type of device of secondary device 206, comparisons to prior access patterns of user 214, a keyword, a quality of network connections, device profiling, behavioral profiling, and data within a repository of known fraud patterns.

In another example, risk policy 260 may include one or more rules related to risk levels 266. Risk levels 266 indicate a risk associated with particular transaction types. Risk levels 266 can be a numeric score within a predefined range, where higher scores indicate a greater level of risk. Transaction types are classifications for transactions. For example, transaction types can include lookup transactions, transactions for authenticating identity 228 of user 214, transactions related to user account 226, and transactions to manage information accessed through service 216.

Risk engine 256 generates risk score 258 for transaction request 224 based on the application of one or more rules of risk policy 260 to context parameters of transaction request 224. As a result, more certainty is present in authenticating transaction request 224 based on a determination of risk score 258 within a current authentication context. In other words, authentication system 201 uses a risk-based, multifactor authentication based on the application of one or more rules in risk policy 260 to the particular context parameters of transaction request 224 to determine risk score 258 for transaction request 224. In this manner, risk engine 256 enables RCS authentication based on determined ones of risk factors 262 and risk levels 266 of transaction request 224.

After authenticating identity 228 of user 214, token 270 is generated to enable access to service 216. Token 270 may be any security token or cookie that attests identity 228 of user 214 within current authentication context. For example, token 270 may be a certificate, a session identifier, a web token, an OpenID Connect OAuth token, a Security Assertion Markup Language (SAML) assertion, or some other suitable type of token. Service provider 202 uses token 270 to enable fulfillment of transaction request 224 by service 216.

Token 270 may include an identifier that uniquely identifies at least one of user 214, primary device 204, or secondary device 206. Token 270 may also include a time stamp indicating when token 270 expires, when token 270 was generated, or a combination of both. Token 270 may be a time-sensitive token such that token 270 expires after a predetermined amount of time has elapsed. The predetermined amount of time may be based on risk score 258, or a level of sensitivity of information accessed by service 216. For example, the predetermined amount of time may provide a shorter amount of time for services that have a greater level of sensitivity than for services that are less sensitive.

Service provider 202 sends token 270 to secondary device 206, or otherwise enables secondary device 206 to access and retrieve token 270 from authentication system 201. Token 270 is then stored on secondary device 206. In various embodiments, a copy of token 270 may also reside on authentication system 201. Secondary device 206 can include token 270 as part of context parameters for a subsequently submitted transaction request 224.

As a result, authentication system 201 operates as a special purpose computer system in which components thereof leverage RCS messaging to enable password-free user authentication login of transactions between various software systems over one or more computer. Thus, authentication system 201 transforms the systems therein into a special purpose computer system as compared to currently available general computer systems that do not have authentication system 201. Currently used general purpose computer systems do not leverage RCS messaging to enable password-free user authentication login of transactions between various software systems over one or more computer networks.

Figure 3:
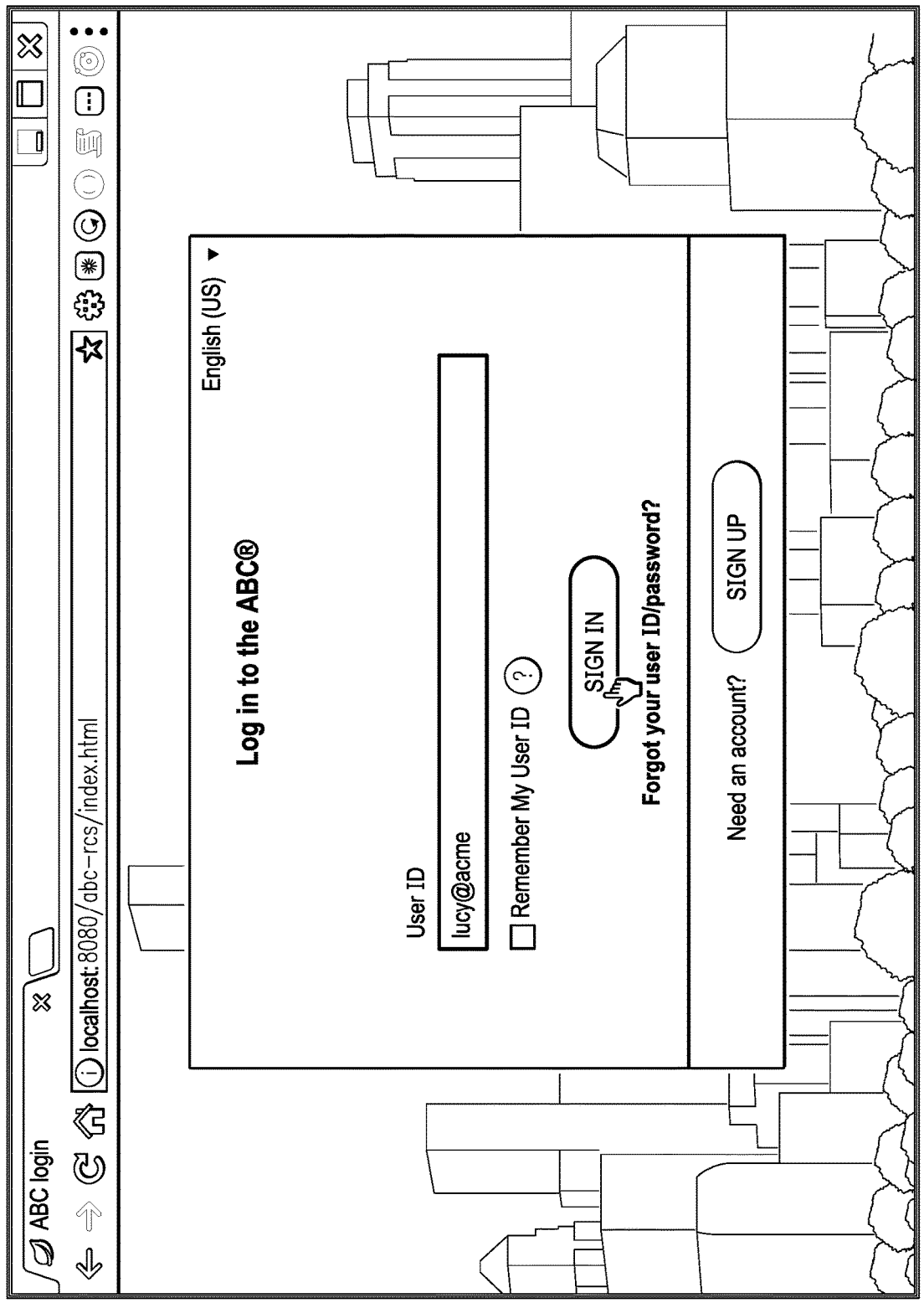
FIG. 3 is a first illustration of a graphical user interface for submitting a first user transaction on a secondary device in accordance with an illustrative embodiment.
Figure 4:
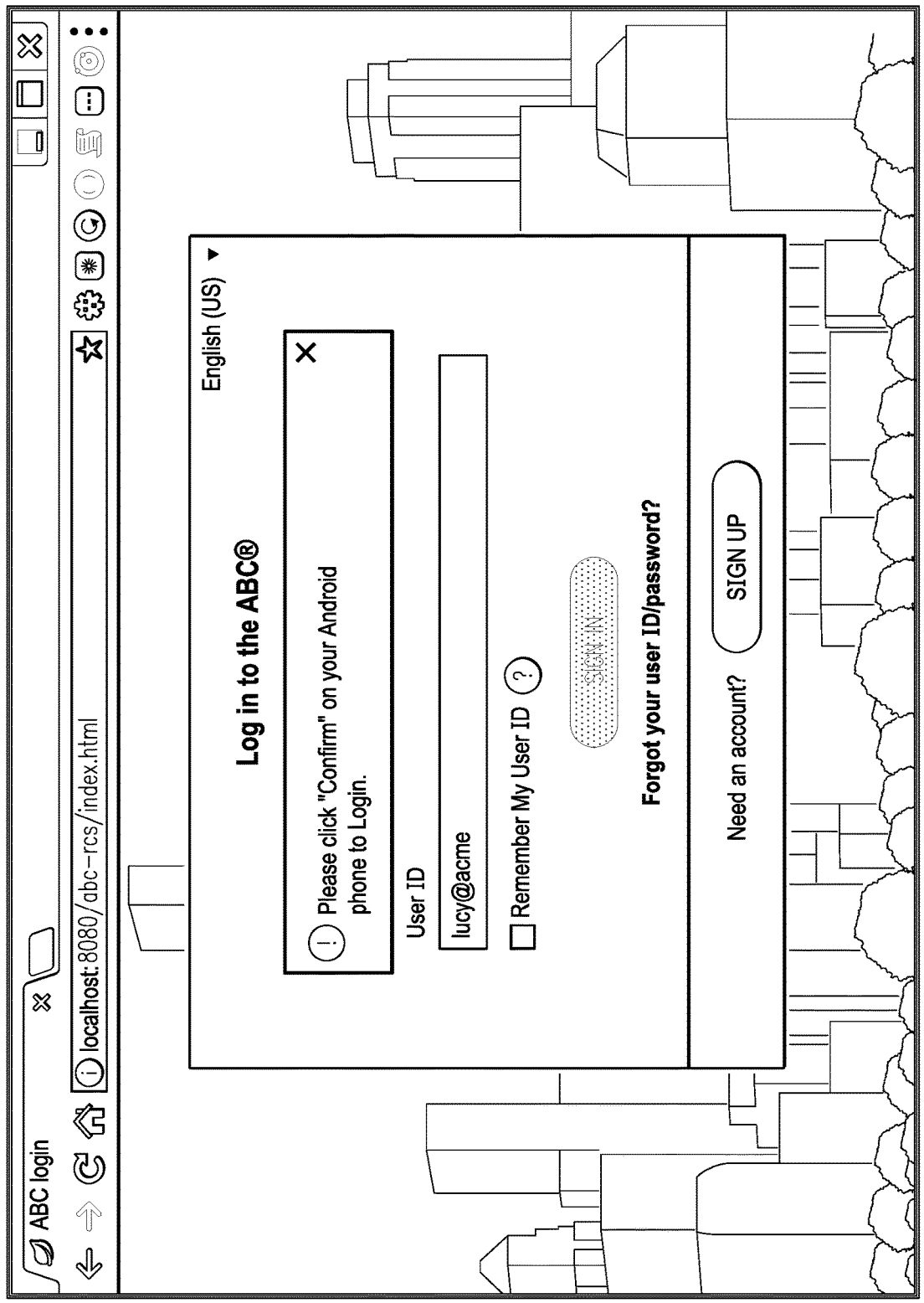
FIG. 4 is a second illustration of a graphical user interface for submitting a first user transaction on a secondary device in accordance with an illustrative embodiment.
Figure 5:
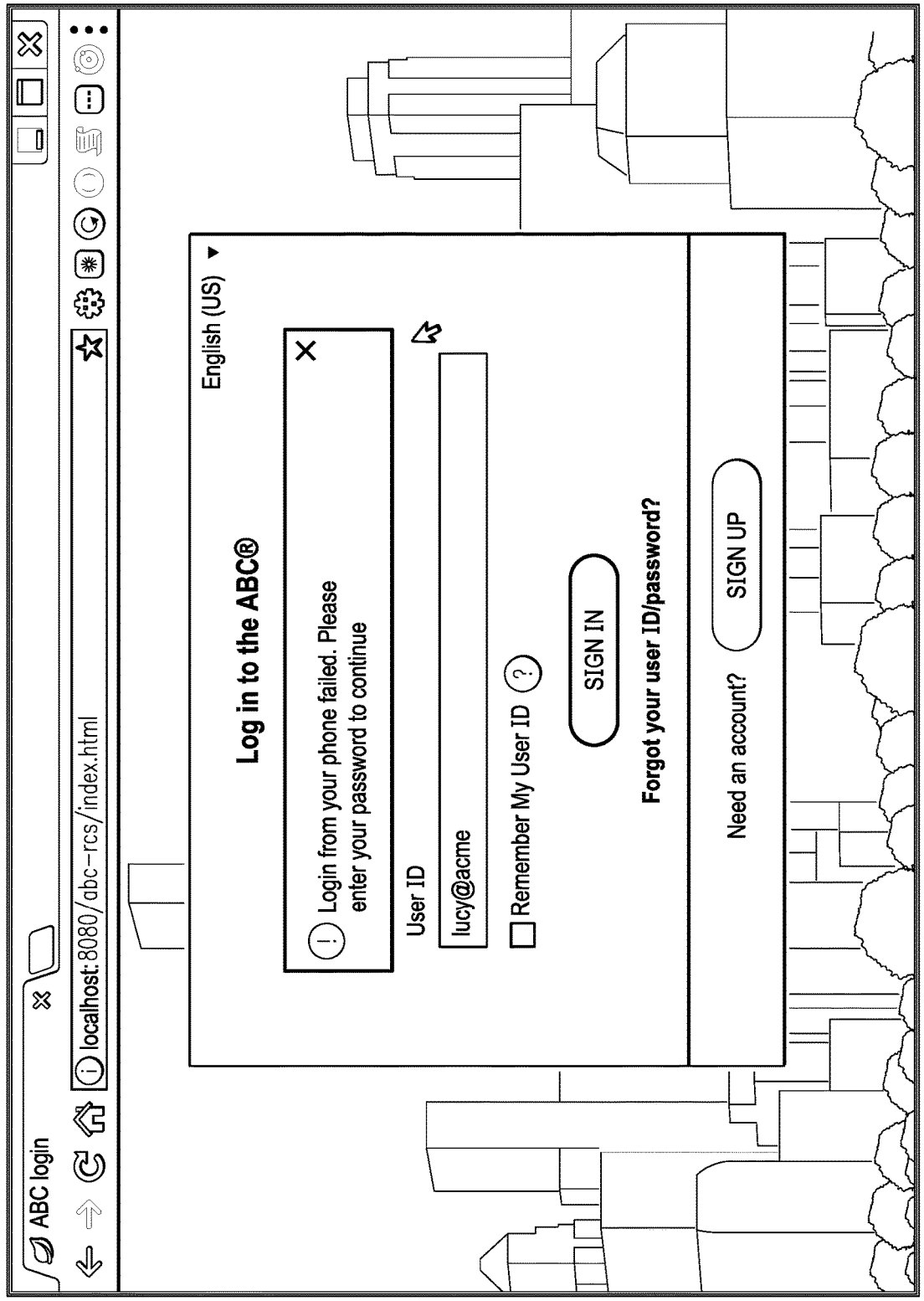
FIG. 5 is a third illustration of a graphical user interface for submitting a first user transaction on a secondary device in accordance with an illustrative embodiment.

With reference next to FIGS. 3-5, illustrations of a graphical user interface for submitting a user transaction on a secondary device are depicted in accordance with an illustrative embodiment. The process in FIGS. 3-5 may be implemented in authentication system 201 and, in particular, in secondary device 206 as shown in block form in FIG. 2.

As illustrated in FIG. 3, transaction request 224 of FIG. 2 takes the form of a login request.

Referring now specifically to FIG. 4, graphical user interface 300 displays a prompt for a user to confirm a transaction request using an RCS primary device registered to the user. If a confirmation is not received, the transaction request is denied, graphical user interface 300 displays a rejection of a mobile authentication, and prompts the user for authentication using different credentials, as illustrated in FIG. 5.

With reference next to FIGS. 6-12, illustrations of a graphical user interface for authenticating a user transaction on an RCS-enabled primary device are depicted in accordance with an illustrative embodiment. The process in FIGS. 6-12 may be implemented in authentication system 201 and, in particular, in primary device 204 shown in block form in FIG. 2.

Figure 6:
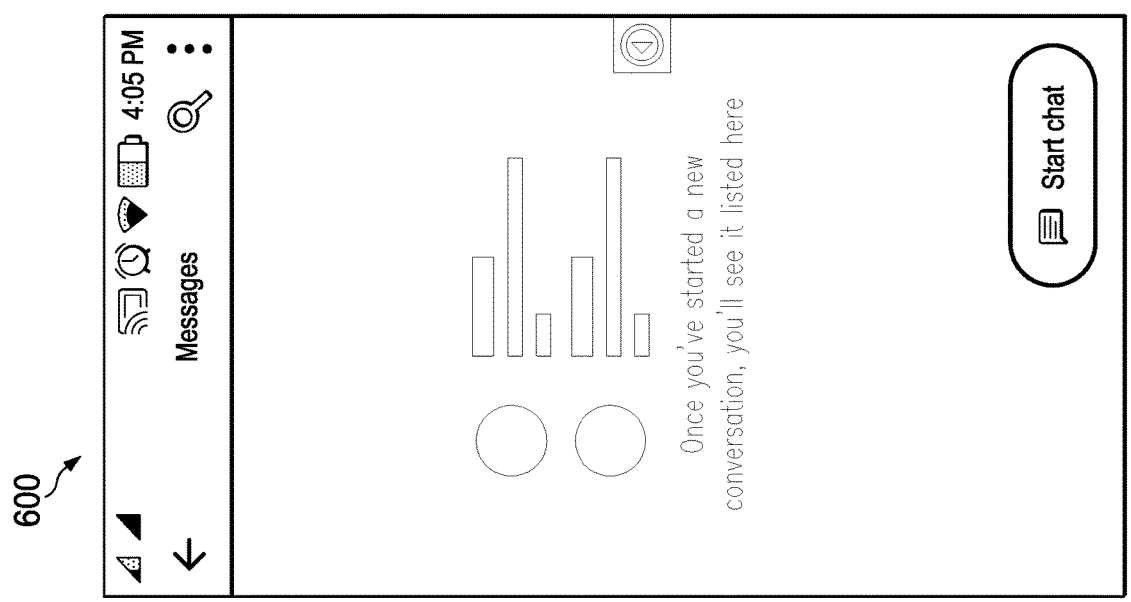
FIG. 6 is a first illustration of a graphical user interface for authenticating a first user transaction on an RCS-enabled primary device in accordance with an illustrative embodiment.

Referring now to FIG. 6, graphical user interface 600 is illustrated for a messaging application, such as messaging application 207 of FIG. 2. When a message is received, the message is displayed in graphical user interface 600, as depicted in FIG. 7.

Figure 7:
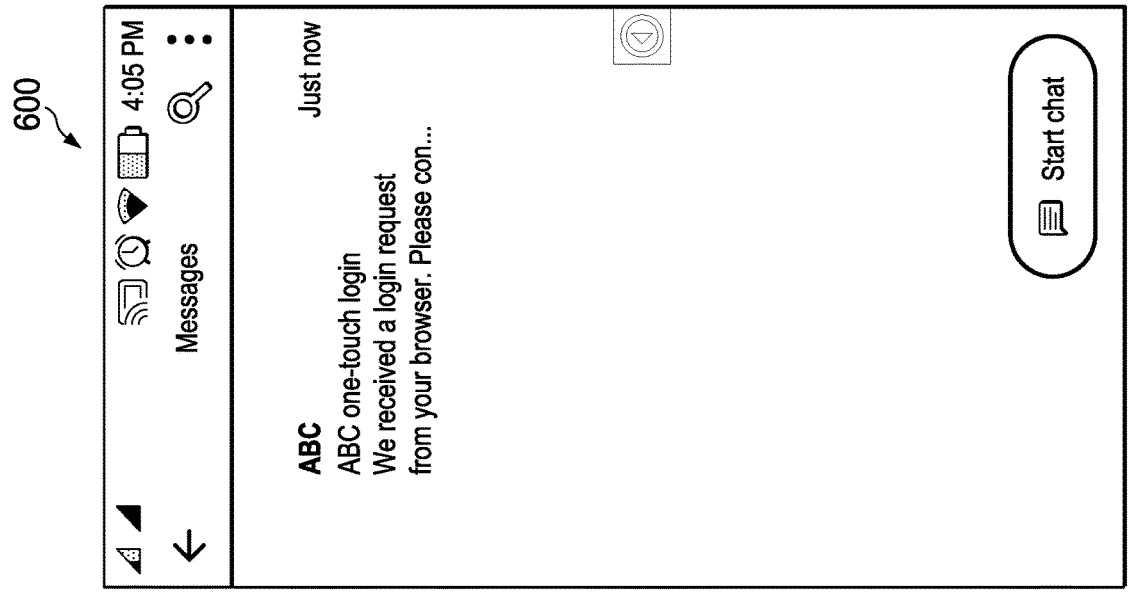
FIG. 7 is a second illustration of a graphical user interface for authenticating a first user transaction on an RCS-enabled primary device in accordance with an illustrative embodiment.
Figure 9:
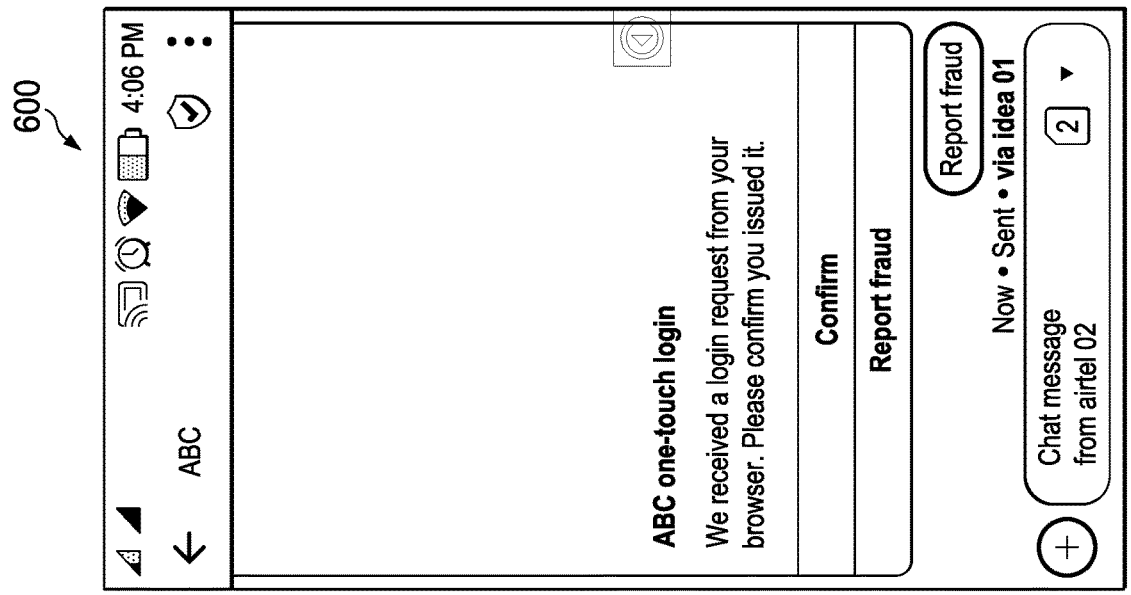
FIG. 9 is a fourth illustration of a graphical user interface for authenticating a first user transaction on an RCS-enabled primary device in accordance with an illustrative embodiment.
Figure 8:
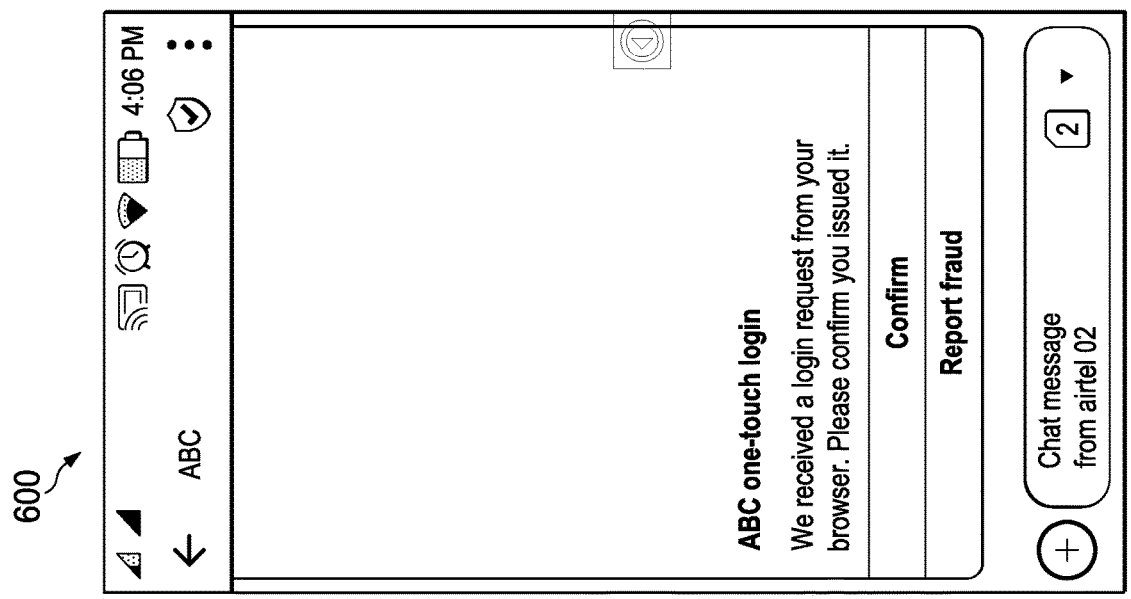
FIG. 8 is a third illustration of a graphical user interface for authenticating a first user transaction on an RCS-enabled primary device in accordance with an illustrative embodiment.
Figure 10:
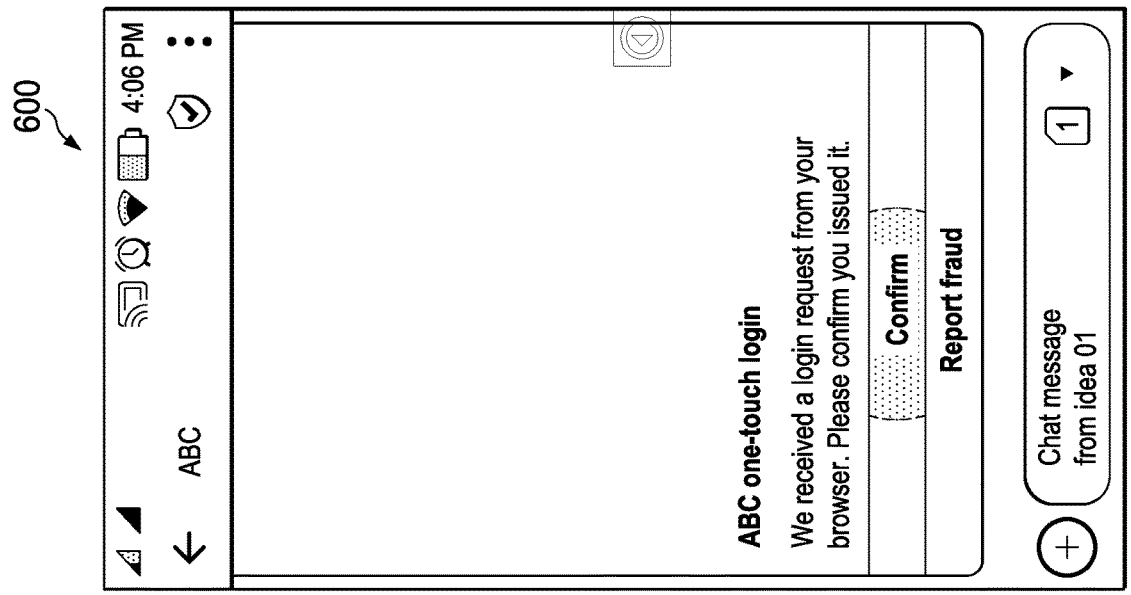
FIG. 10 is a fifth illustration of a graphical user interface for authenticating a first user transaction on an RCS enabled primary device in accordance with an illustrative embodiment.

As shown in FIG. 7, upon clicking the "start chat" button, a transmission object is displayed asking the user to confirm a transaction submitted from a secondary device. If the user clicks the "report fraud" button, as shown in FIG. 8, a message is sent by the mobile device that denies the transaction, as illustrated in FIG. 9. As illustrated in FIG. 10, a subsequent message is then received and displayed that confirms denial of the transaction and submission of a fraud service ticket.

Figure 11:
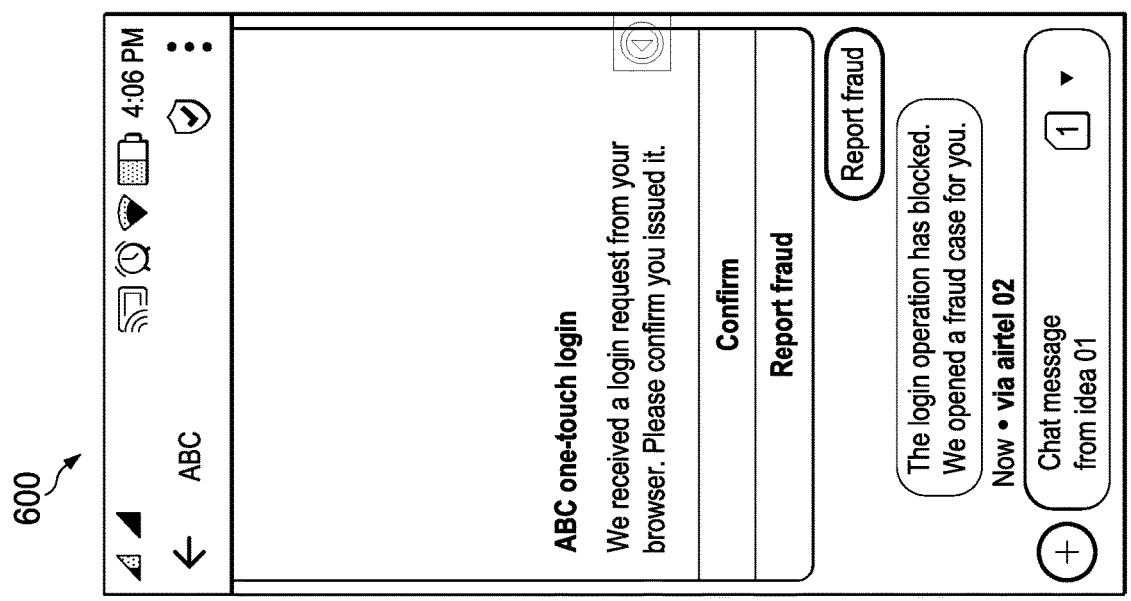
FIG. 11 is a sixth illustration of a graphical user interface for authenticating a first user transaction on an RCS-enabled primary device in accordance with an illustrative embodiment.
Figure 12:
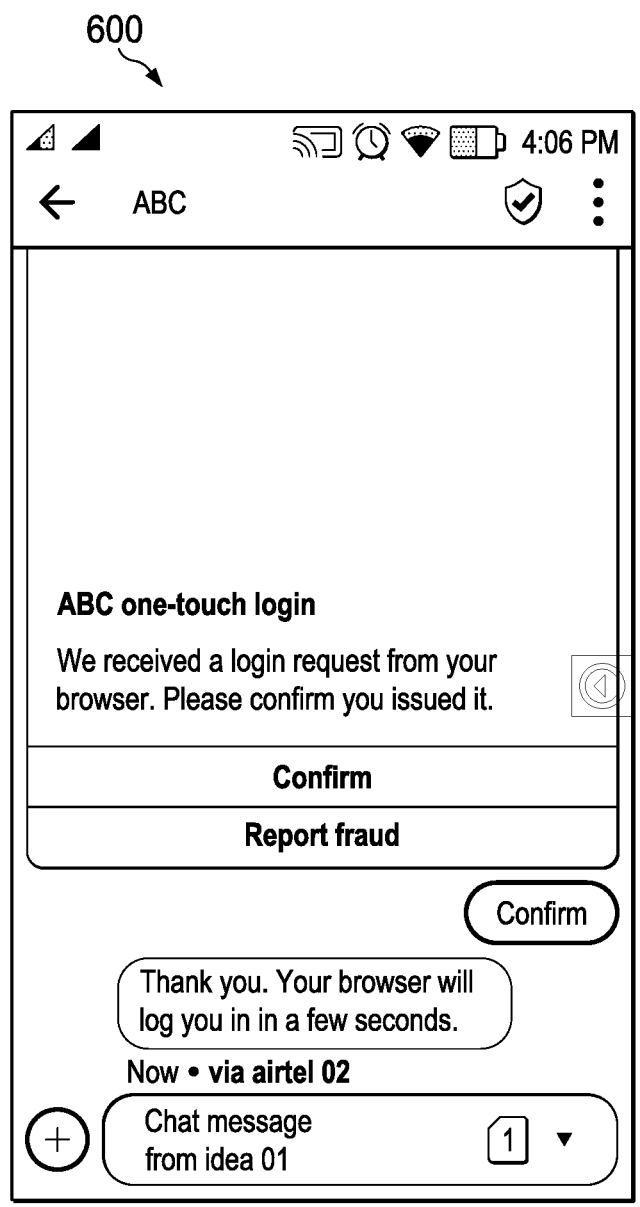
FIG. 12 is a seventh illustration of a graphical user interface for authenticating a first user transaction on an RCS-enabled primary device in accordance with an illustrative embodiment.

Conversely, as shown in FIG. 11, the user clicks the "confirm" button. A message is sent by the mobile device that confirms the transaction, and a subsequent message is then received and displayed that confirms authentication of the transaction, both shown in FIG. 12.

Referring now to FIGS. 13-18, illustrations of a graphical user interface for submitting a user transaction on a secondary device are depicted in accordance with an illustrative embodiment. The process in FIGS. 13-18 may be implemented in authentication system 201 and, in particular, in secondary device 206 shown in block form in FIG. 2.

Figure 13:
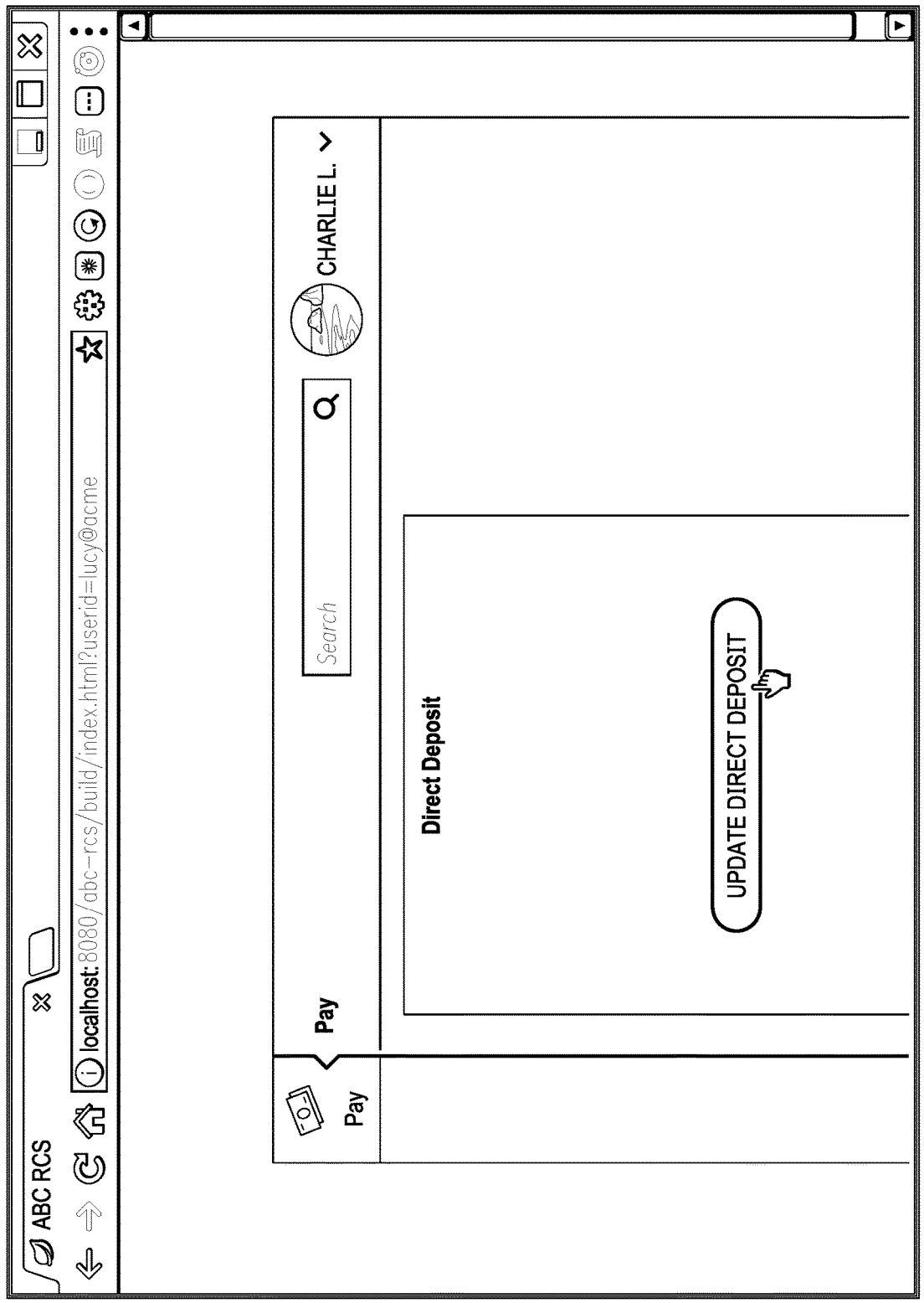
FIG. 13 is a first illustration of a graphical user interface for submitting a second user transaction on a secondary device in accordance with an illustrative embodiment.

As illustrated in FIG. 13, transaction request 224 of FIG. 2 takes the form of an update to direct deposit information. Direct deposit services may be an example of service 216, shown in block form in FIG. 2.

With RCS Business Messaging services, the user does not necessarily see a "from" number on their messaging screen. Instead, as illustrated in FIGS. 13-18, the message can be presented with a logo of the business organization that is sending the communication. The user has the ability to review the information about this organization exposed by the RCS agent. The graphical view of the business logo and the additional information and assurances displayed in the RCS enabled messaging application on the device help increase trust from the end user. This type of message presentation helps in preventing phishing or unauthorized impersonation of the business organization by bad actors, which may attempt to trick the user into believing that they are interacting with the business organization.

Figure 14:
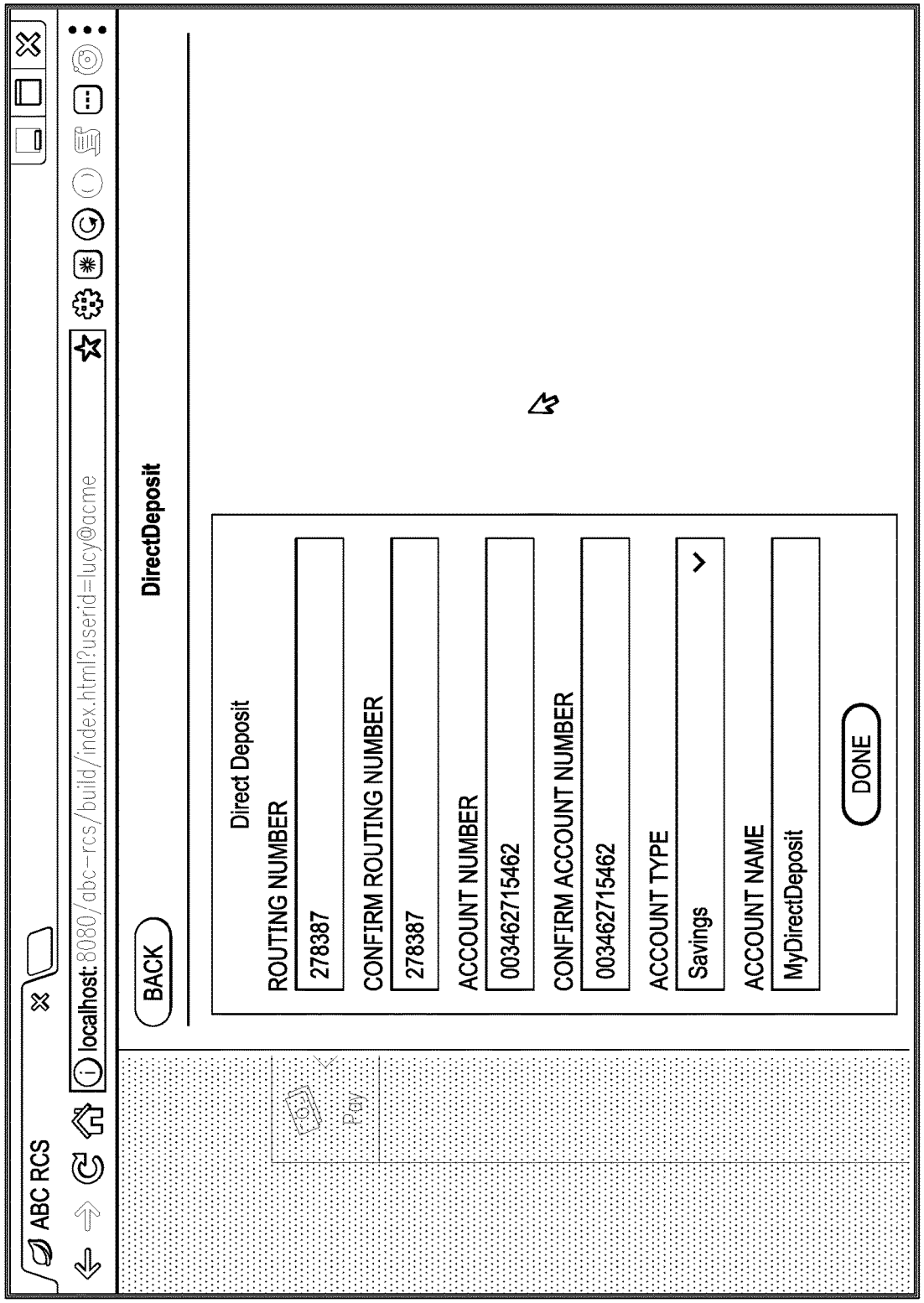
FIG. 14 is a second illustration of a graphical user interface for submitting a second user transaction on a secondary device in accordance with an illustrative embodiment.

As illustrated in FIG. 13, a user selects a particular service by clicking on a related button within graphical user interface 1300. As shown in FIG. 14, information relevant to the selected direct deposit service is displayed in response to receiving the user selection.

Figure 15:
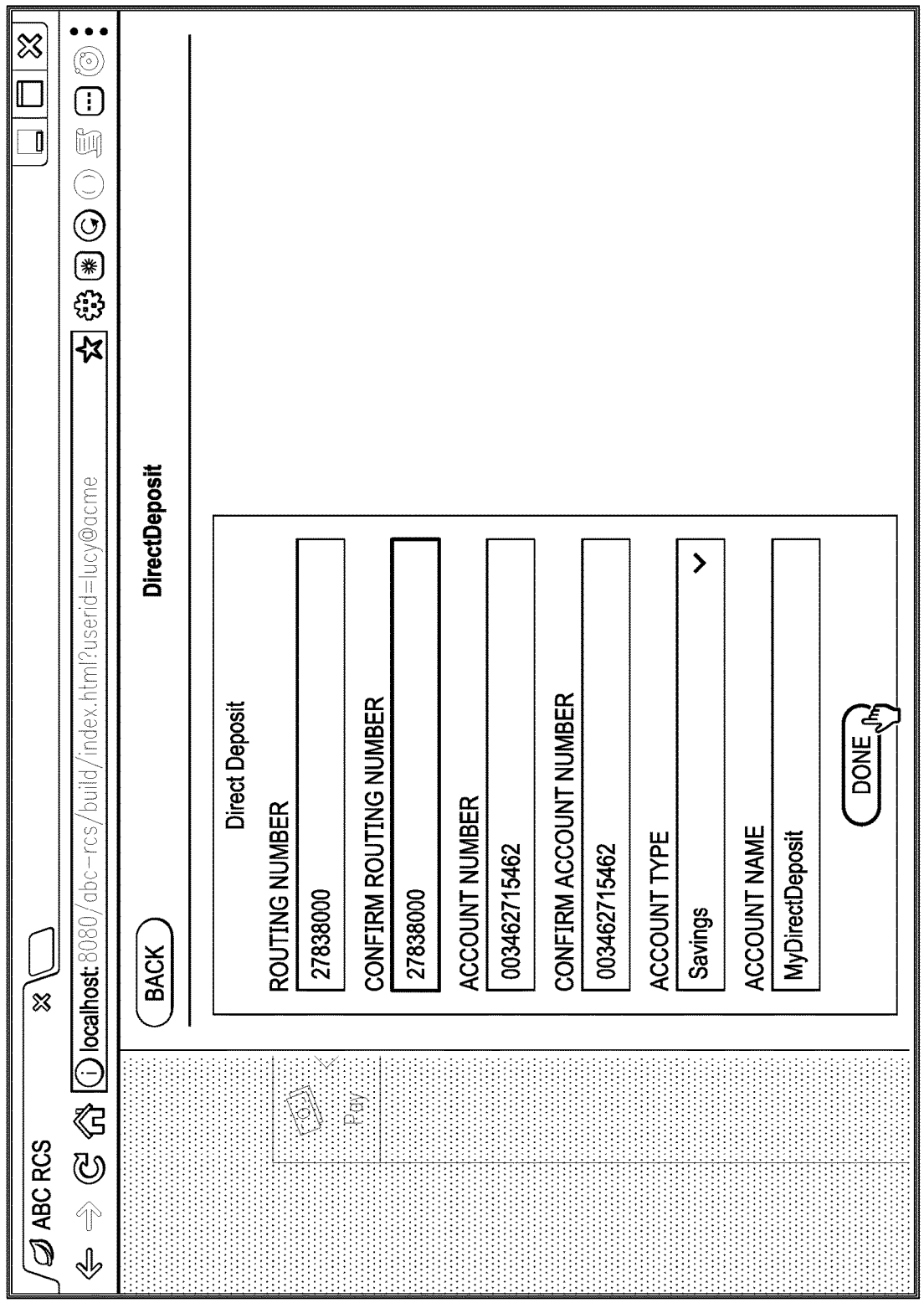
FIG. 15 is a third illustration of a graphical user interface for submitting a second user transaction on a secondary device in accordance with an illustrative embodiment.
Figure 16:
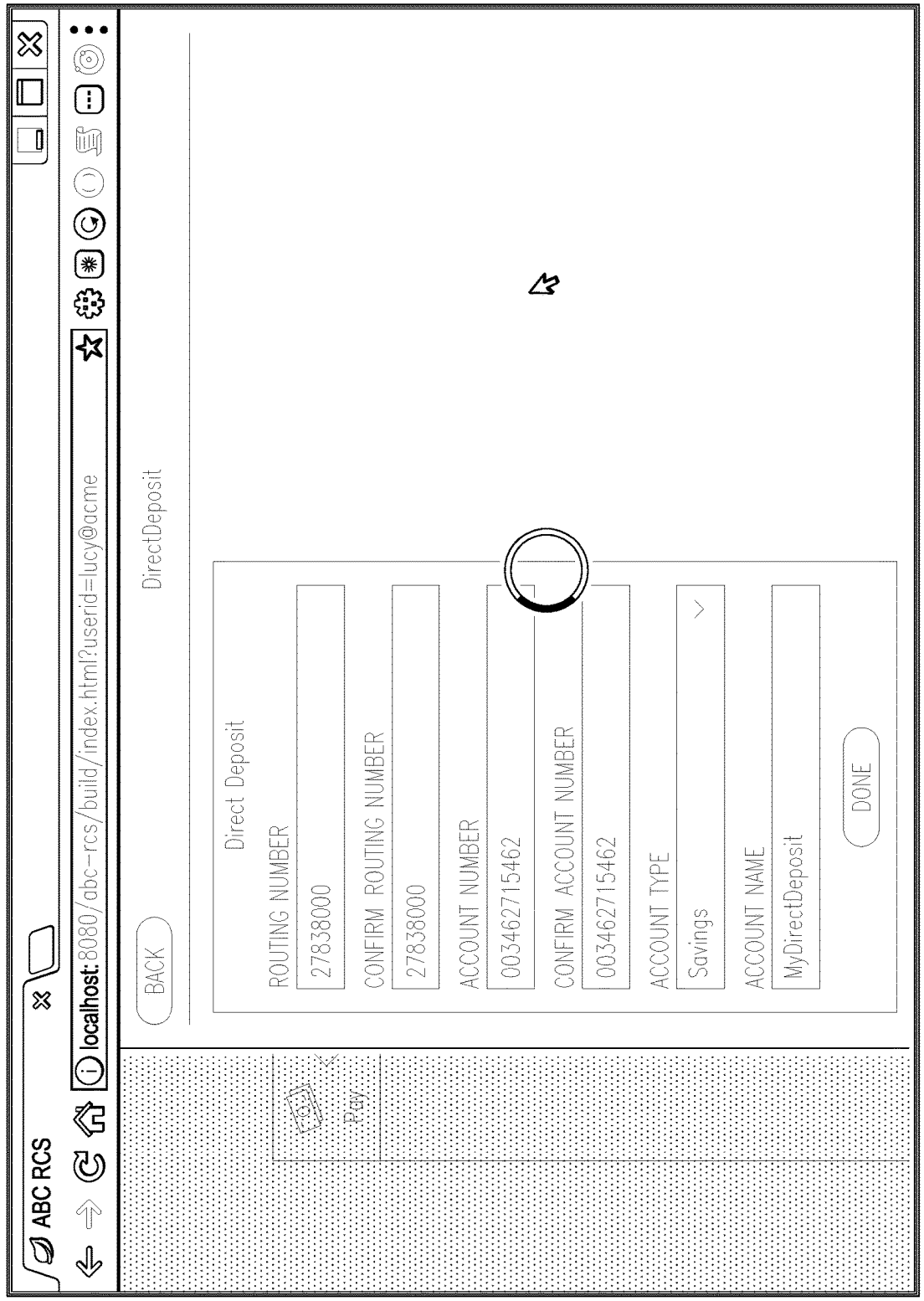
FIG. 16 is a fourth illustration of a graphical user interface for submitting a second user transaction on a secondary device in accordance with an illustrative embodiment.

As illustrated in FIG. 15, the user has updated the routing number associated with the direct deposit service. Graphical user interface 1300 then waits to receive a confirmation of the transaction request from an RCS primary device registered to the user, as depicted in FIG. 16.

Figure 17:
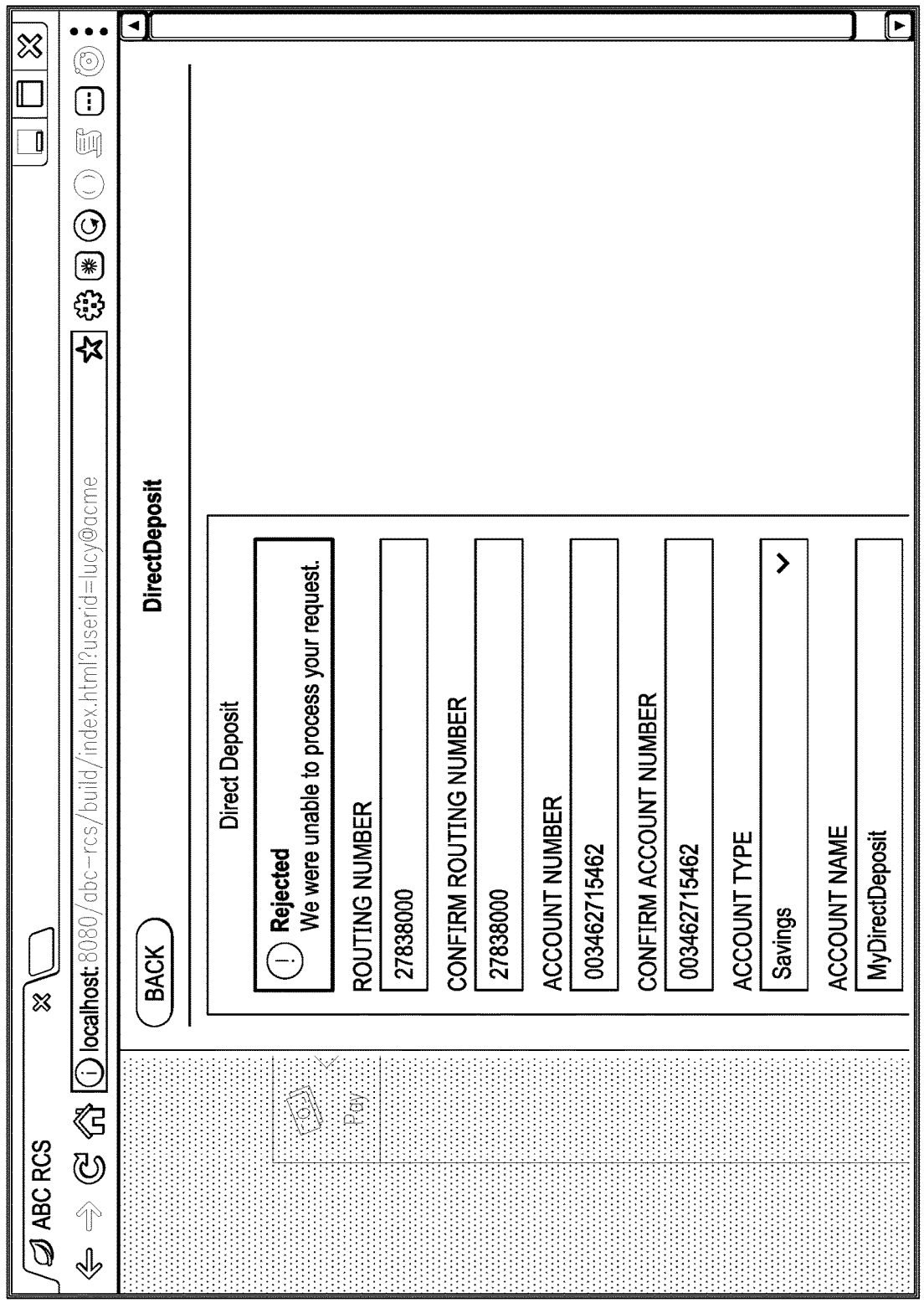
FIG. 17 is a fifth illustration of a graphical user interface for submitting a second user transaction on a secondary device in accordance with an illustrative embodiment.
Figure 18:
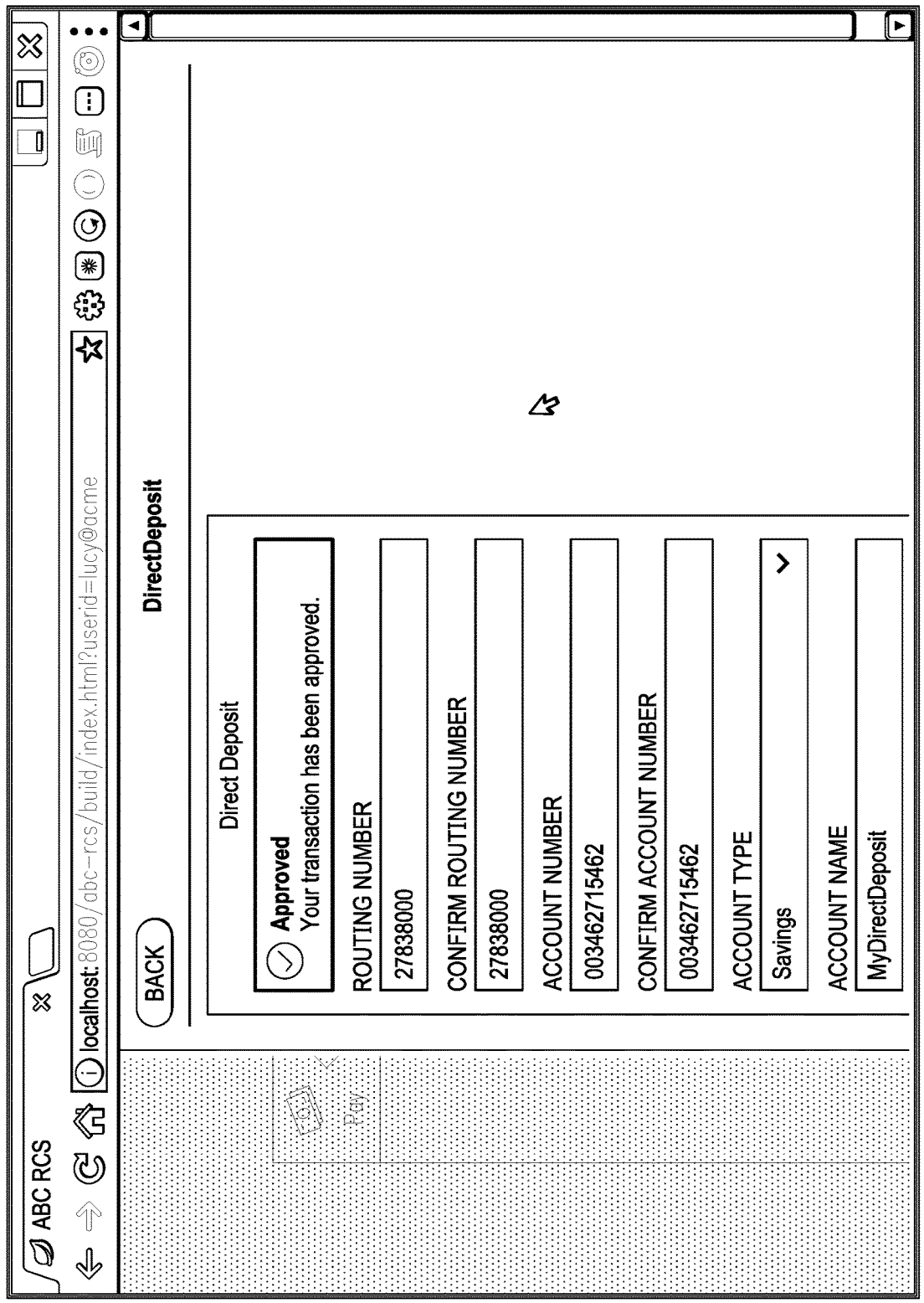
FIG. 18 is a sixth illustration of a graphical user interface for submitting a second user transaction on a secondary device in accordance with an illustrative embodiment.

If a confirmation is not received, the transaction request is denied, and graphical user interface 1300 displays a rejection of the mobile authentication, as illustrated in FIG. 17. Conversely, as shown in FIG. 18, if the confirmation is received from the RCS primary device, graphical user interface 1300 displays a confirmation of the transaction.

With reference next to FIGS. 19-24, illustrations of a graphical user interface for authenticating a user transaction on an RCS-enabled primary device are depicted in accordance with an illustrative embodiment. The process in FIGS. 19-24 may be implemented in authentication system 201 and, in particular, in primary device 204 as shown in block form in FIG. 2.

Figure 19:
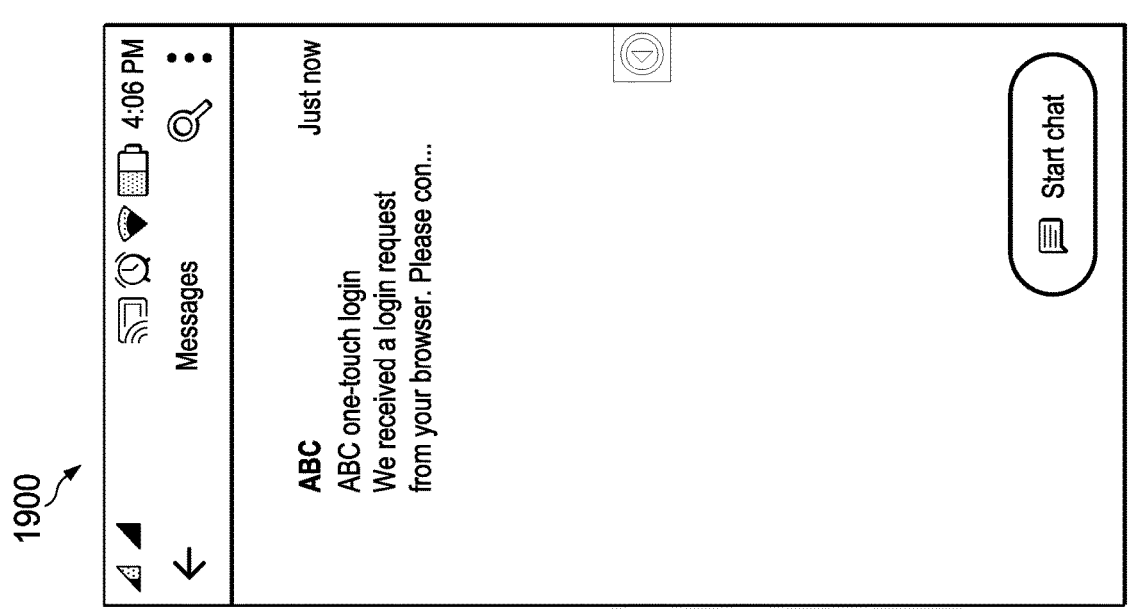
FIG. 19 is a first illustration of a graphical user interface on an RCS-enabled primary device for authenticating a second user transaction in accordance with an illustrative embodiment.

Referring now to FIG. 19, graphical user interface 1900 is illustrated for a messaging application, such as messaging application 207 of FIG. 2. When a message is received, the message is displayed in graphical user interface 1900, as depicted in FIG. 19.

Figure 20:
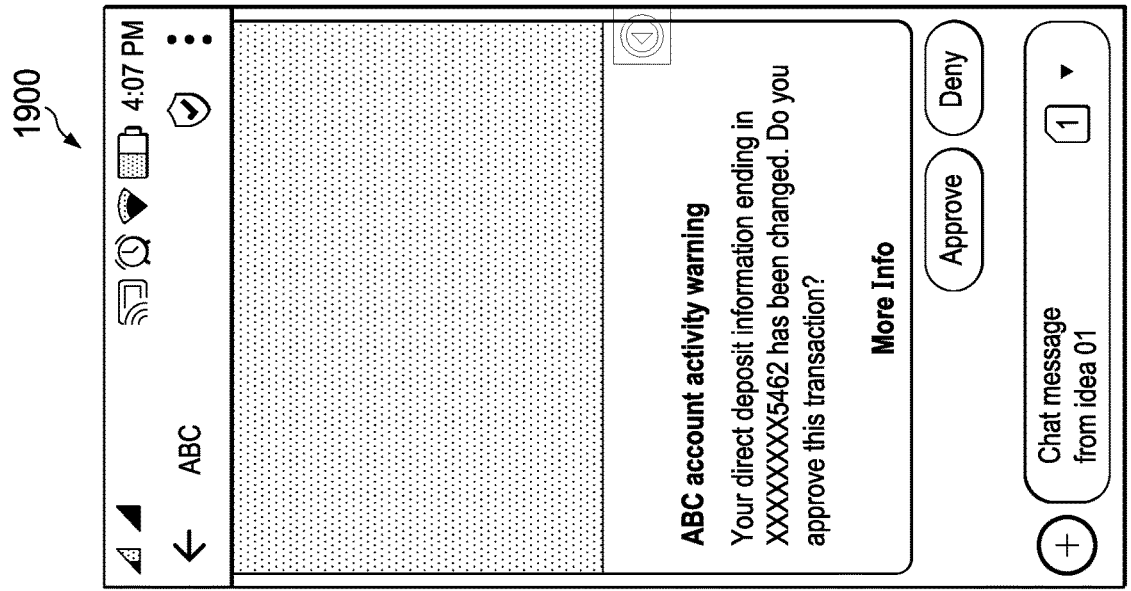
FIG. 20 is a second illustration of a graphical user interface on an RCS-enabled primary device for authenticating a second user transaction in accordance with an illustrative embodiment.

As shown in FIG. 19, upon clicking the "Start chat" button, a transmission object is displayed asking the user to confirm a transaction submitted from a secondary device. If the user clicks the "Deny" button, as shown in FIG. 20, a message is sent by the mobile device that denies the transaction, as illustrated in FIG. 21. As illustrated in FIG. 22, a subsequent message is then received and displayed that confirms denial of the transaction and submission of a fraud service ticket.

Figure 23:
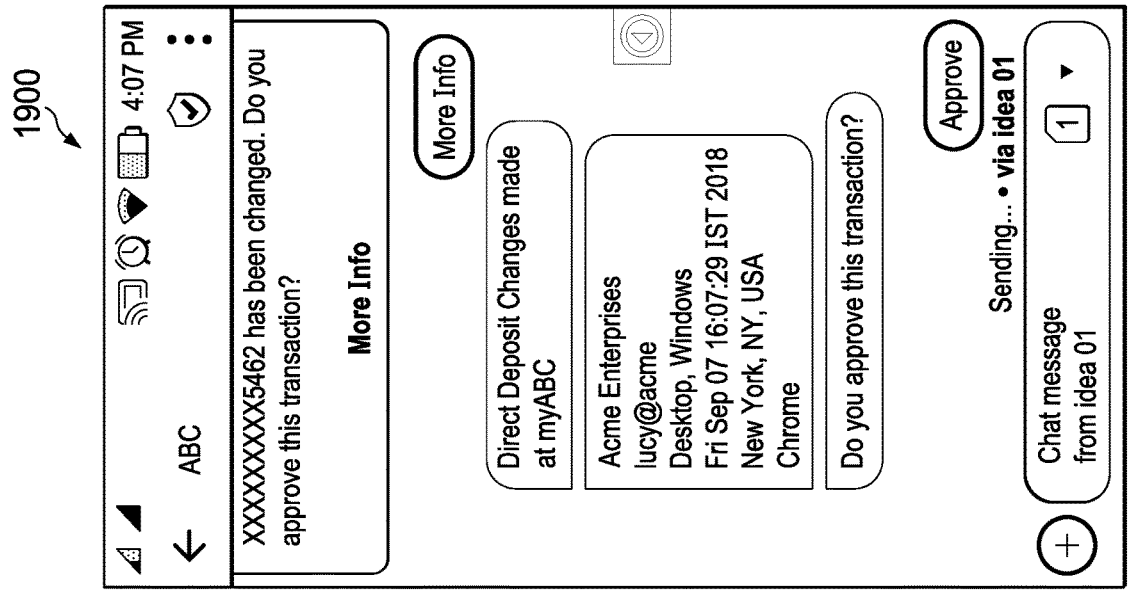
FIG. 23 is a fifth illustration of a graphical user interface on an RCS-enabled primary device for authenticating a second user transaction in accordance with an illustrative embodiment.

The concept here is that users are given a choice to either approve or deny the transaction as is. However, with RCS, users have the ability to expand and see more context around the transaction that the user is being prompted to approve or deny. For example, as illustrated in FIG. 23, the user can see detailed information regarding the transaction request by selecting the "More Info" button. Detailed information regarding the transaction, such as information 249 of FIG. 2, can then be displayed as chat messages within graphical user interface 1900.

This additional context regarding the transaction helps the end user make a more conscious evaluation of the transaction and decide whether it is legitimate or not. In the event that the transaction was not authorized, the additional context makes the user perfectly aware of the attempted actions by a bad actor. This level of transparency is often not feasible in other methods or channels, and helps to further enhance trust in the system.

Figure 24:
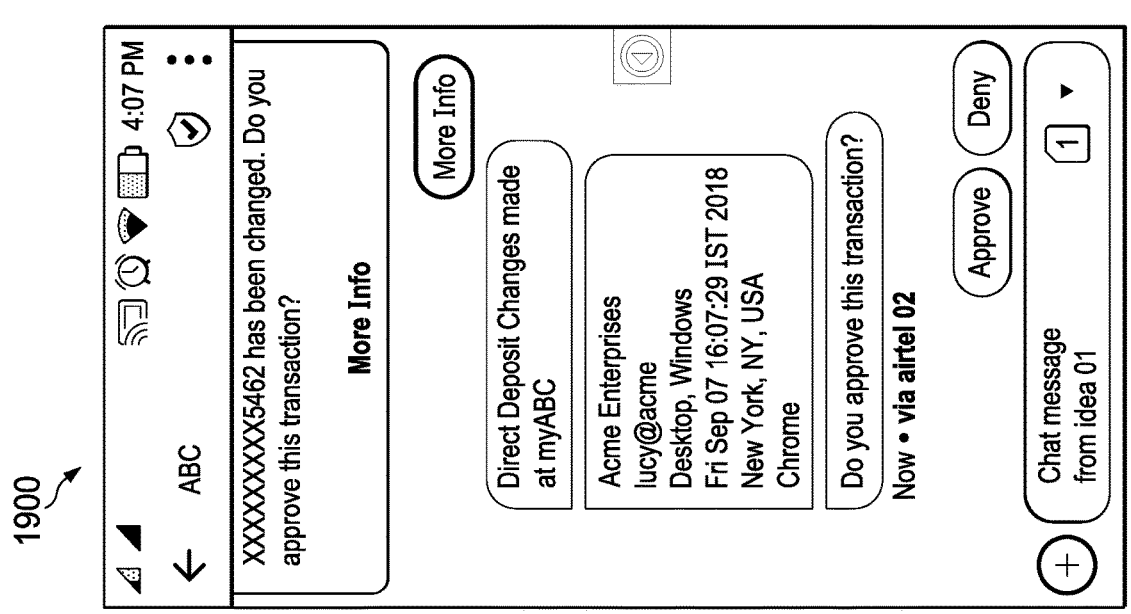
FIG. 24 is a sixth illustration of a graphical user interface on an RCS-enabled primary device for authenticating a second user transaction in accordance with an illustrative embodiment.

As shown in FIG. 24, the user clicks on the "Approve" button and a message is sent by the mobile device that approves the transaction. A subsequent message may later be received and displayed that confirms authentication of the transaction, similar to that shown in FIG. 12.

Figure 25:
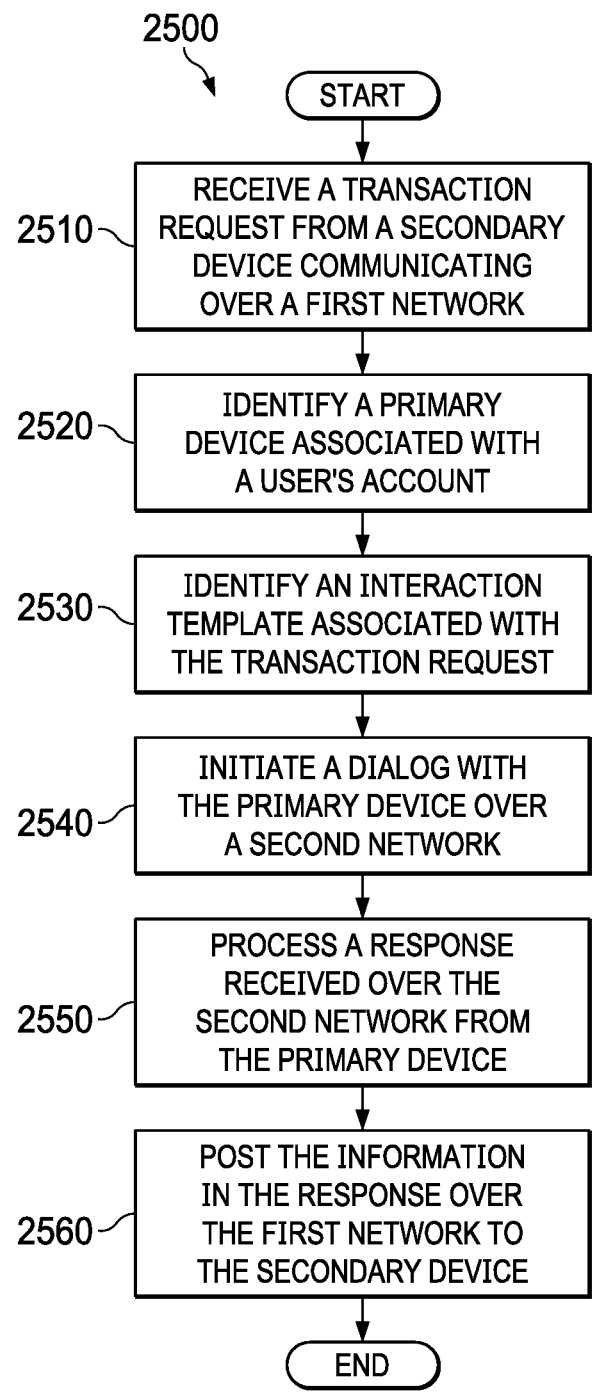
FIG. 25 is an illustration of a simplified flowchart of a method for authenticating a user transaction in accordance with an illustrative embodiment.

With reference next to FIG. 25, an illustration of a simplified flowchart of a process for authenticating a transaction is depicted in accordance with an illustrative embodiment. The process of FIG. 25 can be a software process implemented in one or more components of a human resources modeling system, such as in gateway 220 and RBM agent 238 of FIG. 2.

Process 2500 begins by receiving a transaction request from a secondary device communicating over a first network (step 2510). The transaction request references a user's account, such as user account 226 of FIG. 2. The transaction request identifies the secondary device within the first network.

Process 2500 identifies a primary device associated with the user's account (step 2520). The primary device communicates over a second network.

Process 2500 identifies an interaction template associated with the transaction request (step 2530). The interaction template describes a conversational flow of messages for requesting verification of the transaction. The interaction template can be interaction template 240 of FIG. 2.

Process 2500 initiates a dialog with the primary device over the second network (step 2540). The dialog includes sending a transmission, such as transmission 248 in FIG. 2, built from a message in the interaction template that requests verification of the transaction.

Process 2500 processes a response received over the second network from the primary device (step 2550). The information in the response is processed based on rules that describe a conversational flow for the interaction template.

Process 2500 posts the information in the response over the first network to the secondary device (step 2560), with process 2500 terminating thereafter. The transaction is authenticated at the secondary device according to the posted information.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 26:
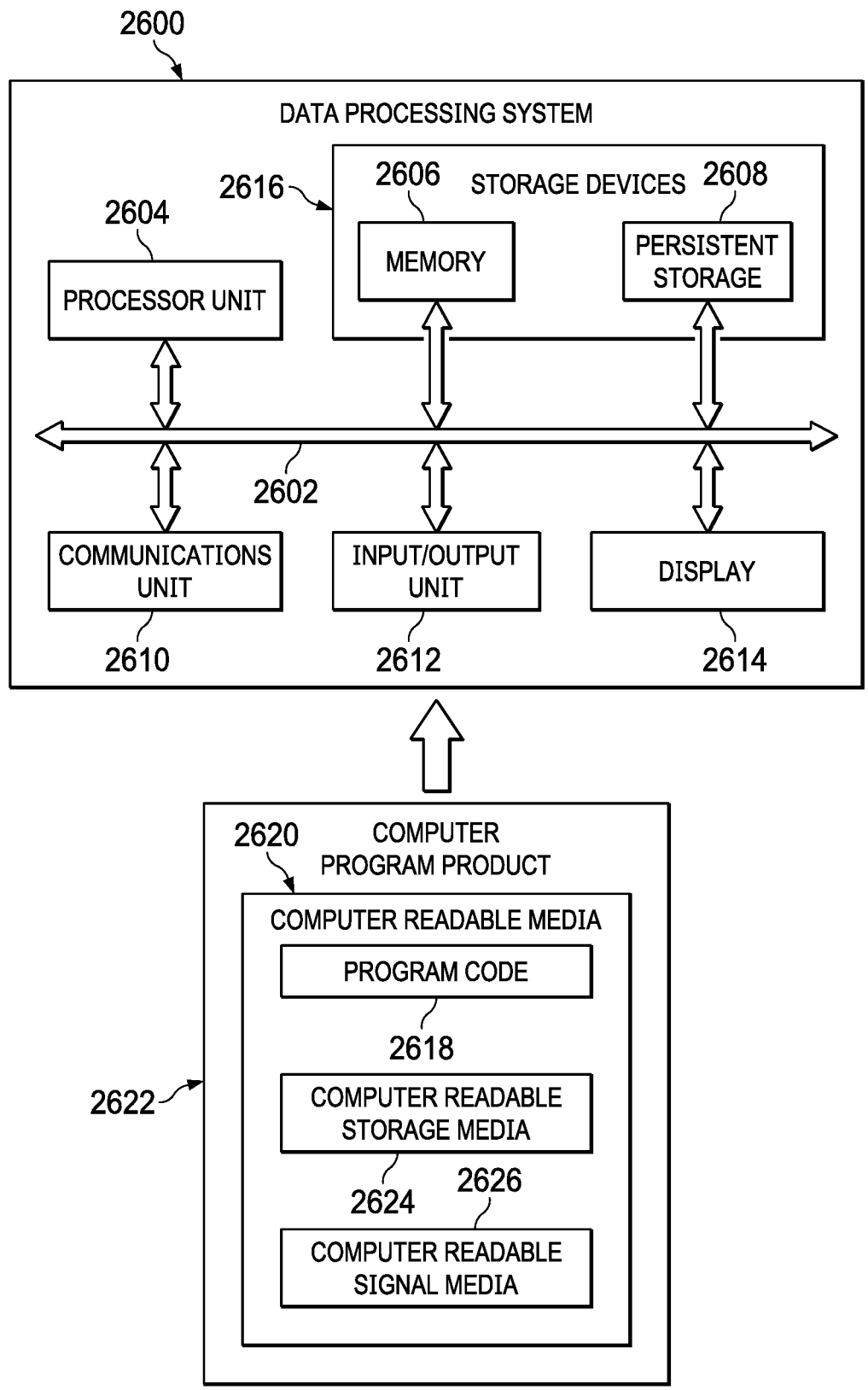
FIG. 26 is an illustration of a block diagram of a data processing system in accordance with an illustrative embodiment.

Turning now to FIG. 26, an illustration of a block diagram of a data processing system is depicted in accordance with an illustrative embodiment. Data processing system 2600 may be used to implement one or more of authentication system 201, primary device 204, and secondary device 206 in FIG. 2. In this illustrative example, data processing system 2600 includes communications framework 2602, which provides communications between processor unit 2604, memory 2606, persistent storage 2608, communications unit 2610, input/output (I/O) unit 2612, and display 2614. In this example, communications framework 2602 may take the form of a bus system.

Processor unit 2604 serves to execute instructions for software that may be loaded into memory 2606. Processor unit 2604 may be a number of processors, a multi-processor core, or some other type of processor, depending on the particular implementation.

Memory 2606 and persistent storage 2608 are examples of storage devices 2616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2616 may also be referred to as computer readable storage devices in these illustrative examples. Memory 2606, in these examples, may be, for example, a random-access memory or any other suitable volatile or non-volatile storage device. Persistent storage 2608 may take various forms, depending on the particular implementation.

For example, persistent storage 2608 may contain one or more components or devices. For example, persistent storage 2608 may be a hard drive, a solid state hard drive, a flash memory, a rewritable optical disk, a rewritable magnetic tape, or some combination of the above. The media used by persistent storage 2608 also may be removable. For example, a removable hard drive may be used for persistent storage 2608.

Communications unit 2610, in these illustrative examples, provides for communications with other data processing systems or devices. In these illustrative examples, communications unit 2610 is a network interface card.

Input/output unit 2612 allows for input and output of data with other devices that may be connected to data processing system 2600. For example, input/output unit 2612 may provide a connection for user input through at least one of a keyboard, a mouse, or some other suitable input device. Further, input/output unit 2612 may send output to a printer. Display 2614 provides a mechanism to display information to a user.

Instructions for at least one of the operating system, applications, or programs may be located in storage devices 2616, which are in communication with processor unit 2604 through communications framework 2602. The processes of the different embodiments may be performed by processor unit 2604 using computer-implemented instructions, which may be located in a memory, such as memory 2606.

These instructions are referred to as program code, computer usable program code, or computer readable program code that may be read and executed by a processor in processor unit 2604. The program code in the different embodiments may be embodied on different physical or computer readable storage media, such as memory 2606 or persistent storage 2608.

Program code 2618 is located in a functional form on computer readable media 2620 that is selectively removable and may be loaded onto or transferred to data processing system 2600 for execution by processor unit 2604. Program code 2618 and computer readable media 2620 form computer program product 2622 in these illustrative examples. In one example, computer readable media 2620 may be computer readable storage media 2624 or computer readable signal media 2626.

In these illustrative examples, computer readable storage media 2624 is a physical or tangible storage device used to store program code 2618 rather than a medium that propagates or transmits program code 2618.

Alternatively, program code 2618 may be transferred to data processing system 2600 using computer readable signal media 2626. Computer readable signal media 2626 may be, for example, a propagated data signal containing program code 2618. For example, computer readable signal media 2626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2600 are not meant to provide architectural limitations to the manner in which different embodiments may be implemented. The different illustrative embodiments may be implemented in a data processing system including components in addition to or in place of those illustrated for data processing system 2600. Other components shown in FIG. 26 can be varied from the illustrative examples shown. The different embodiments may be implemented using any hardware device or system capable of running program code 2618.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for authenticating a transaction comprising:
   receiving, by a gateway, a transaction request from a secondary device communicating over a first network, wherein the transaction request references a user's account and wherein the transaction identifies the secondary device within the first network;
   identifying, by the gateway, a primary device associated with the user's account, wherein the primary device communicates over a second network;
   identifying, by the gateway, an interaction template associated with the transaction request, wherein the interaction template describes a conversational flow of messages for requesting verification of the transaction;
   initiating, by the gateway, a dialog with the primary device over the second network, wherein the dialog includes sending a transmission built from a message in the interaction template that requests verification of the transaction;
   processing, by the gateway, a response received over the second network from the primary device, wherein information in the response is processed based on rules that describe a conversational flow for the interaction template; and
   posting, by the gateway, the information in the response over the first network to the secondary device, wherein the transaction is authenticated at the secondary device according to the posted information.

2. The method of claim 1, wherein the transaction is a login transaction at the secondary device.

3. The method of claim 1, wherein the transaction is an account management or a financial transaction at the secondary device.

4. The method of claim 1, wherein the primary device includes a Subscriber Identity Module (SIM) that is associated with a Rich Communication Services (RCS) identity of the user; and
   the secondary device does not include a SIM that is associated with the RCS identity of the user.

5. The method of claim 1, further comprising:
   determining, by an authentication service, a risk score for the transaction based on a number of contextual risk factors;
   using, by the authentication service, the authentication scheme to authenticate the identity of the user within the authentication context;
   in response to successfully authenticating the identity of the user within the authentication context, determining, by the authentication service, whether the transaction is a permitted transaction based on an assurance level associated with the authentication context; and
   in response to determining that the transaction is the permitted transaction, authenticating, by the authentication service, the transaction.

6. The method of claim 5, further comprising:
   identifying, by the authentication service, the number of contextual risk factors based on context parameters of the transaction; and
   wherein the context parameters include a transaction type, and at least one of a current authentication context, a time of day that the transaction is received, a geographic location from which the transaction is received, a device type used by the user to submit the transaction, prior access behavioral patterns of the user, a keyword, and a quality of network.

7. The method of claim 6, wherein the transaction type is selected from a lookup transaction, the transaction for authenticating the identity of the user, the transaction related to an account of the user, and the transaction to manage privileges of the account of the user.

8. The method of claim 6, wherein the transaction is a lookup transaction, the method further comprising:

identifying, by the authentication service, a number of accounts based on information and the context parameters of the transaction;
returning, by the authentication service, an authentication prompt, for information to disambiguate a user account from the number of accounts; and
using, by the authentication service, the authentication scheme to authenticate the identity of the user within the authentication context, wherein the authentication context is associated with the user account.

9. The method of claim 8, further comprising:
receiving, by the authentication service, the transaction over the particular channel, wherein the transaction includes the keyword that is associated with the user, wherein the keyword comprises one or more of a username, an email address, a name of an employer, a client identifier, or a company registration code;
determining, by the authentication service, the user profile for the user based on the keyword; and
returning, by the authentication service, an authentication prompt for credentials to authenticate the identity of the user according to the authentication scheme.

10. The method of claim 5, further comprising:
generating, by the authentication service, a token in response to successfully authenticating the identity of the user within the authentication context;
sending, by the authentication service, the token from the authentication service to a user device, wherein the token is stored on the user device; and
receiving, by the authentication service, a second transaction, wherein an authentication context of the transaction includes the token.

11. The method of claim 5, further comprising:
in response to determining that the transaction is not the permitted transaction based on an identity assurance level of the authentication context, determining, by the authentication service executing on the computer system, a step-up authentication scheme for authenticating the identity of the user within a step-up authentication context, wherein the transaction is the permitted transaction based on an identity assurance level associated with the step-up authentication context; and
returning, by the authentication service executing on the computer system, an authentication prompt for credentials to authenticate the identity of the user according to the step-up authentication scheme.

12. A computer system comprising:
a hardware processor; and
a gateway, in communication with the hardware processor and configured:
to receive a transaction request from a secondary device communicating over a first network, wherein the transaction request references a user's account and wherein the transaction identifies the secondary device within the first network;
to identify a primary device associated with the user's account, wherein the primary device communicates over a second network;
to identify an interaction template associated with the transaction request, wherein the interaction template describes a conversational flow of messages for requesting verification of the transaction;
to initiate a dialog with the primary device over the second network, wherein the dialog includes sending a transmission built from a message in the interaction template that requests verification of the transaction;
to process a response received over the second network from the primary device, wherein information in the response is processed based on rules that describe a conversational flow for the interaction template; and
to post the information in the response over the first network to the secondary device, wherein the transaction is authenticated at the secondary device according to the posted information.

13. The computer system of claim 12, wherein the transaction is a login transaction at the secondary device.

14. The computer system of claim 12, wherein the transaction is an account management or financial transaction at the secondary device.

15. The computer system of claim 12, wherein the primary device includes a Subscriber Identity Module (SIM) that is associated with a Rich Communication Services (RCS) identity of the user; and
the secondary device does not include a SIM that is associated with the RCS identity of the user.

16. The computer system of claim 12, further comprising:
to determine a risk score for the transaction based on a number of contextual risk factors;
to use the authentication scheme to authenticate the identity of the user within the authentication context;
to determine, in response to successfully authenticating the identity of the user within the authentication context, whether the transaction is a permitted transaction based on an assurance level associated with the authentication context; and
to authenticate the transaction in response to determining that the transaction is the permitted transaction.

17. The computer system of claim 16, wherein the authentication service is further configured:
to identify the number of contextual risk factors based on context parameters of the transaction; and
wherein the context parameters include a transaction type, and at least one of a current authentication context, a time of day that the transaction is received, a geographic location from which the transaction is received, a device type used by the user to submit the transaction, prior access behavioral patterns of the user, a keyword, and a quality of network.

18. The computer system of claim 17, wherein the transaction type is selected from a lookup transaction, the transaction for authenticating the identity of the user, the transaction related to an account of the user, and the transaction to manage privileges of the account of the user.

19. The computer system of claim 17, wherein the transaction is a lookup transaction, the authentication service further configured:
to identify a number of accounts based on information and the return an authentication prompt, for information to disambiguate a user account from the number of accounts; and
to use the authentication scheme to authenticate the identity of the user within the authentication context, wherein the authentication context is associated with the user account.

20. The computer system of claim 17, wherein the authentication service is further configured:
to receive the transaction over the particular channel, wherein the transaction includes the keyword that is associated with the user, wherein the keyword comprises one or more of a username, an email address, a name of an employer, a client identifier, or a company registration code;

to determine the user profile for the user based on the keyword; and to return an authentication prompt for credentials to authenticate the identity of the user according to the authentication scheme.

21. The computer system of claim 17, wherein the authentication service is further configured:

to generate a token in response to successfully authenticating the identity of the user within the authentication context;

to send the token from the authentication service to a user device, wherein the token is stored on the user device; and to receive a second transaction, wherein an authentication context of the transaction includes the token.

22. The computer system of claim 17, wherein the authentication service is further configured:

in response to determining that the transaction is not the permitted transaction based on an identity assurance level of the authentication context, to determine a step-up authentication scheme for authenticating the identity of the user within a step-up authentication context, wherein the transaction is the permitted transaction based on an identity assurance level associated with the step-up authentication context; and to return an authentication prompt for credentials to authenticate the identity of the user according to the step-up authentication scheme.

23. A computer program product for authenticating a transaction comprising:

a non-transitory computer readable storage media having program code stored thereon:

program code, stored on the computer readable storage media, for receiving a transaction request from a secondary device communicating over a first network, wherein the transaction request references a user's account and wherein the transaction identifies the secondary device within the first network;

program code, stored on the computer readable storage media, for identifying a primary device associated with the user's account, wherein the primary device communicates over a second network;

program code, stored on the computer readable storage media, for identifying an interaction template associated with the transaction request, wherein the interaction template describes a conversational flow of messages for requesting verification of the transaction;

program code, stored on the computer readable storage media, for initiating a dialog with the primary device over the second network, wherein the dialog includes sending a transmission built from a message in the interaction template that requests verification of the transaction;

program code, stored on the computer readable storage media, for processing a response received over the second network from the primary device, wherein information in the response is processed based on rules that describe a conversational flow for the interaction template; and program code, stored on the computer readable storage media, for posting the information in the response over the first network to the secondary device, wherein the transaction is authenticated at the secondary device according to the posted information.

24. The computer program product of claim 23, wherein the transaction is a login transaction at the secondary device.

25. The computer program product of claim 23, wherein the transaction is an account management transaction at the secondary device.

26. The computer program product of claim 23, wherein the primary device includes a Subscriber Identity Module (SIM) that is associated with a Rich Communication Services (RCS) identity of the user; and the secondary device does not include a SIM that is associated with the RCS identity of the user.

27. The computer program product of claim 23, further comprising:

program code, stored on the computer readable storage media, for determining a risk score for the transaction based on a number of contextual risk factors;

program code, stored on the computer readable storage media, for using the authentication scheme to authenticate the identity of the user within the authentication context;

program code, stored on the computer readable storage media, for determining whether the transaction is a permitted transaction based on an assurance level associated with the authentication context in response to successfully authenticating the identity of the user within the authentication context; and program code, stored on the computer readable storage media, for authenticating the transaction in response to determining that the transaction is the permitted transaction.

28. The computer program product of claim 27, further comprising:

program code, stored on the computer readable storage media, for identifying the number of contextual risk factors based on context parameters of the transaction; and wherein the context parameters include a transaction type, and at least one of a current authentication context, a time of day that the transaction is received, a geographic location from which the transaction is received, a device type used by the user to submit the transaction, prior access behavioral patterns of the user, a keyword, and a quality of network.

29. The computer program product of claim 28, wherein the transaction type is selected from a lookup transaction, the transaction for authenticating the identity of the user, the transaction related to an account of the user, and the transaction to manage privileges of the account of the user.

30. The computer program product of claim 28, wherein the transaction is a lookup transaction, the program code further comprising:

program code, stored on the computer readable storage media, for identifying a number of accounts based on information and the context parameters of the transaction;

program code, stored on the computer readable storage media, for returning an authentication prompt, for information to disambiguate a user account from the number of accounts; and program code, stored on the computer readable storage media, for using the authentication scheme to authenticate the identity of the user within the authentication context, wherein the authentication context is associated with the user account.

31. The computer program product of claim 30, further comprising:

program code, stored on the computer readable storage media, for receiving the transaction over the particular channel, wherein the transaction includes the keyword that is associated with the user, wherein the keyword comprises one or more of a username, an email address, a name of an employer, a client identifier, or a company registration code;
program code, stored on the computer readable storage media, for determining the user profile for the user based on the keyword; and
program code, stored on the computer readable storage media, for returning an authentication prompt for credentials to authenticate the identity of the user according to the authentication scheme.

32. Computer program product of claim 27, further comprising:
program code, stored on the computer readable storage media, for generating a token in response to successfully authenticating the identity of the user within the authentication context;
program code, stored on the computer readable storage media, for sending the token from the authentication service to a user device, wherein the token is stored on the user device; and
program code, stored on the computer readable storage media, for receiving a second transaction, wherein an authentication context of the transaction includes the token.

33. The computer program product of claim 27, further comprising:
program code, stored on the computer readable storage media, for determining a step-up authentication scheme for authenticating the identity of the user within a step-up authentication context in response to determining that the transaction is not the permitted transaction based on an identity assurance level of the authentication context, wherein the transaction is the permitted transaction based on an identity assurance level associated with the step-up authentication context; and
program code, stored on the computer readable storage media, for returning an authentication prompt for credentials to authenticate the identity of the user according to the step-up authentication scheme.

* * * * *